US012676149B1

(12) United States Patent
Wang et al.

(10) Patent No.: US 12,676,149 B1
(45) Date of Patent: Jul. 7, 2026

(54) CONTENT-RELATED ACTIONS BASED ON CONTEXT

(71) Applicant: Amazon Technologies, Inc., Seattle, WA (US)

(72) Inventors: Allen Wang, Glendale, CA (US); Chongshu Qian, Seattle, WA (US); Srikanth Nori, Arlington, MA (US); Joshua Maxwell Rutheiser, Seattle, WA (US); Lei Raymond Lu, Arcadia, CA (US); Jack Andrew Tomlinson, Ladera Ranch, CA (US); Matthew Brian Urtnowski, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 18/440,253

(22) Filed: Feb. 13, 2024

Related U.S. Application Data

(63) Continuation of application No. 17/542,805, filed on Dec. 6, 2021, now Pat. No. 11,935,533.

(51) Int. Cl.
| *G10L 15/22* | (2006.01) |
| *H04N 21/422* | (2011.01) |
| *H04N 21/858* | (2011.01) |

(52) U.S. Cl.
CPC ....... *G10L 15/22* (2013.01); *H04N 21/42203* (2013.01); *H04N 21/8586* (2013.01); *G10L 2015/223* (2013.01)

(58) Field of Classification Search
CPC ... G10L 15/22; G10L 15/07; H04N 21/42203; H04N 21/854; H04L 51/02; H04L 51/52; G06F 3/167
See application file for complete search history.

(56) References Cited

U.S. PATENT DOCUMENTS

| 10,013,500 | B1 | 7/2018 | Mcclintock et al. |
| 2016/0313868 | A1* | 10/2016 | Weng ..................... B60K 35/85 |
| 2017/0139657 | A1 | 5/2017 | Shah et al. |
| 2017/0235768 | A1 | 8/2017 | Amrutkar et al. |
| 2018/0300324 | A1 | 10/2018 | Ziraknejad et al. |

(Continued)

OTHER PUBLICATIONS

U.S. Appl. No. 17/542,805, "Notice of Allowance," mailed Nov. 15, 2023, 12 pages.

*Primary Examiner* — Yogeshkumar Patel
(74) *Attorney, Agent, or Firm* — Kilpatrick Townsend & Stockton LLP

(57) ABSTRACT

Techniques are described for maintaining contextual data to support content-related actions. In an example, a system stories second content at a source. The source is associated with first content. The system sends, to a device, an object that indicates the first content. From the device at a first time, the system receives first data indicating a first request for the second content and including source information that indicates the source. From the device at a second time, the system receives second data indicating a second request for the second content, the second data including the source information, the first data and the second data received at a frequency indicated by the object. The system determines that the requests are associated with the first content based on the source information included in the received data, and stores third data indicating a presentation of the first content by the device.

20 Claims, 14 Drawing Sheets

(56)        References Cited

U.S. PATENT DOCUMENTS

| | | | |
|---|---|---|---|
| 2019/0325084 A1* | 10/2019 | Peng | G06Q 10/00 |
| 2021/0104236 A1* | 4/2021 | Doggett | G10L 15/22 |
| 2021/0118442 A1* | 4/2021 | Poddar | G06Q 10/40 |
| 2023/0004555 A1* | 1/2023 | Ferreira Moreno | |
| | | | G06F 16/3329 |

* cited by examiner

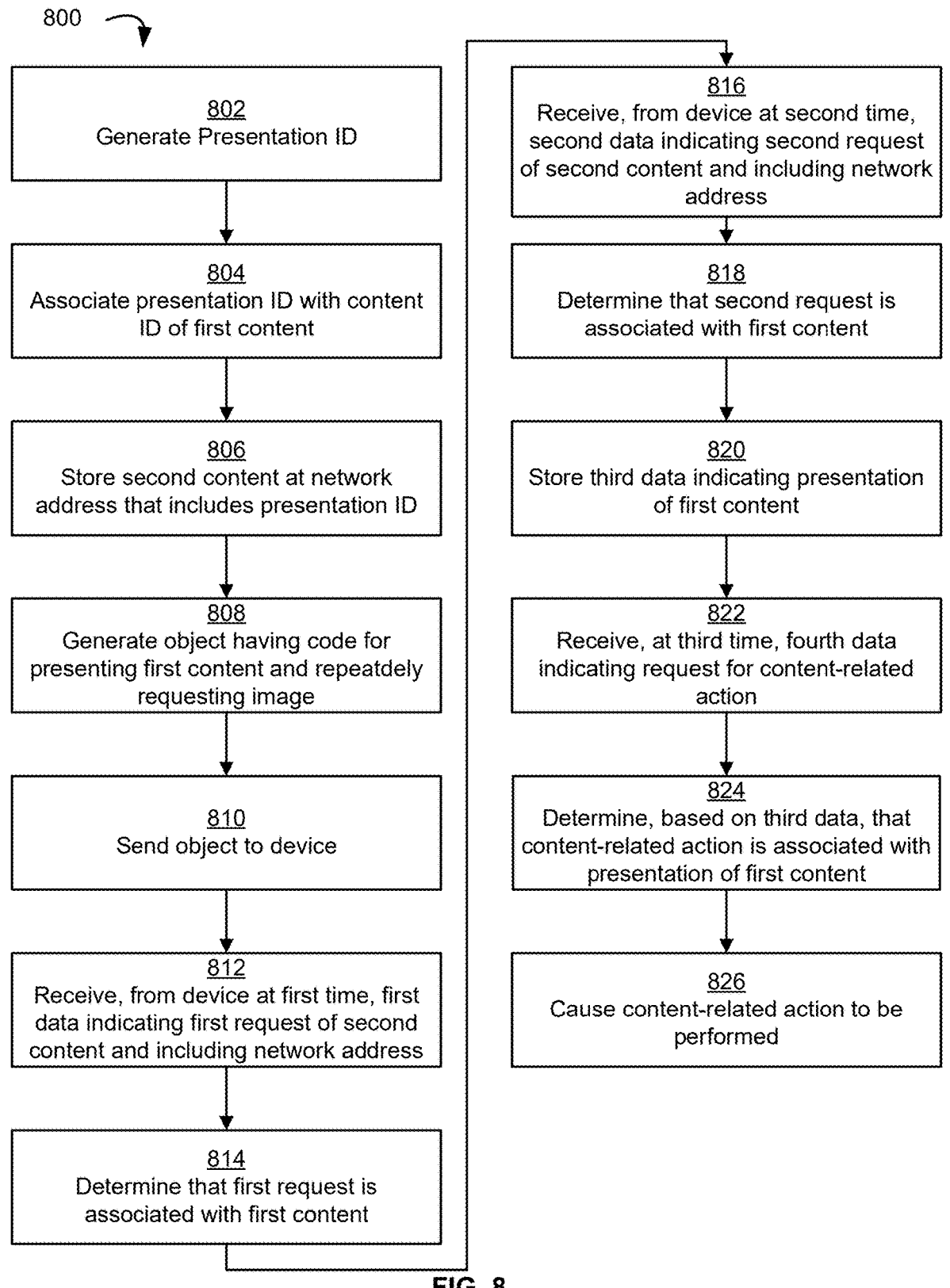

800

802
Generate Presentation ID

804
Associate presentation ID with content ID of first content

806
Store second content at network address that includes presentation ID

808
Generate object having code for presenting first content and repeatdely requesting image

810
Send object to device

812
Receive, from device at first time, first data indicating first request of second content and including network address

814
Determine that first request is associated with first content

816
Receive, from device at second time, second data indicating second request of second content and including network address

818
Determine that second request is associated with first content

820
Store third data indicating presentation of first content

822
Receive, at third time, fourth data indicating request for content-related action

824
Determine, based on third data, that content-related action is associated with presentation of first content

826
Cause content-related action to be performed

1002
Determine a request of a device associated with an account for a content-related action

1004
Contextual data valid?

N →

1006
Send instructions to device for additional user input

Y

1008
Determine contextual data associated with account ID

1010
Cause content-related action to be performed

1100

1102
Determine a request of a device associated with an account for a content-related action

1104
Determine a set of contextual data associated with the account

1106
Selectable Contextual data?

N →

1108
Send instructions to device for additional user input

Y

1110
Select first contextual data

CONTENT-RELATED ACTIONS BASED ON CONTEXT

CROSS-REFERENCE TO RELATED APPLICATIONS

This application is a continuation claiming priority to and the benefit of U.S. application Ser. No. 17/542,805, filed on Dec. 6, 2021, and titled "CONTENT-RELATED ACTIONS BASED ON CONTEXT," the content of which is herein incorporated in its entirety for all purposes.

BACKGROUND

Different modalities are available to control devices. An example modality is touch and relies on graphical user interfaces. Another example modality is vocal and relies on a voice user interface. Voice-based modality can employ what is referred to as near-field voice recognition, in which a user speaks into a microphone located on a hand-held device. Other voice-based modality systems employ far-field voice recognition, in which a user can speak to a device while the user is within the general vicinity of the device, e.g., within the same room, but not necessarily in close proximity to or even facing the device. Systems can implement one or both modalities.

BRIEF DESCRIPTION OF THE DRAWINGS

Various embodiments in accordance with the present disclosure will be described with reference to the drawings, in which:

FIG. 8 illustrates an example of a flow for generating and sending an object to a computing device such that the computing device can present content and periodically request an image, according to embodiments of the present disclosure;

DETAILED DESCRIPTION

Figure 1:
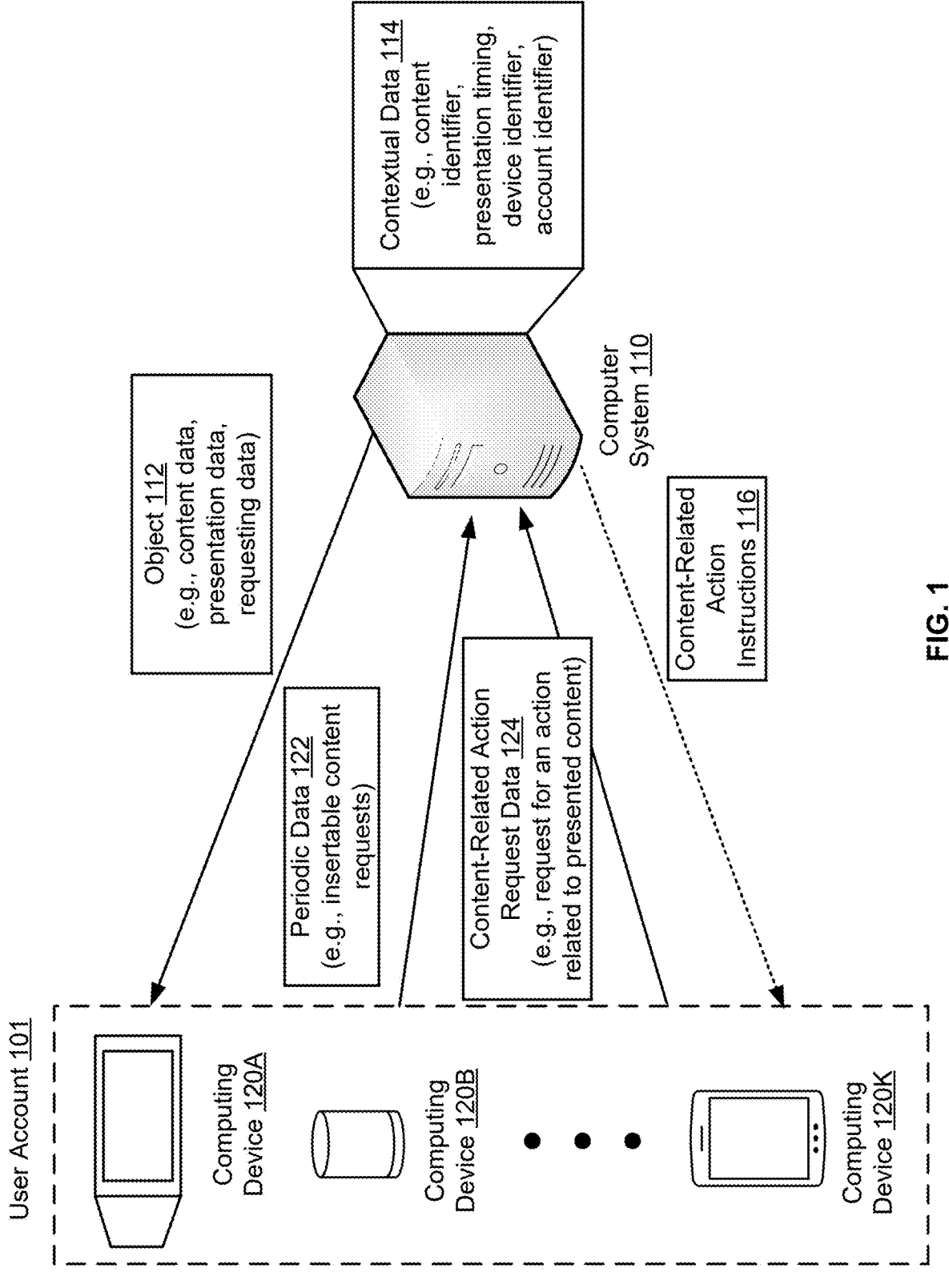
FIG. 1 illustrates an example of an environment for providing content-related actions based on contextual data, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of present disclosure are directed to, among other things, generating and maintaining contextual data to support content-related actions. In an example, a computer system generates and sends data to a computing device associated with an account. The data can be formatted as a document or any other suitable object, which can include first data that can be used for presenting or otherwise representing first content (e.g., an image or a multimedia file), second data for requesting second content (e.g., 1 pixel×1 pixel data) upon the presentation of the first content, and third data representing a frequency at which to request (e.g., on a periodic basis) the second content while the presentation of the first content continues. The requests for the second content can identify the first content that is being presented and an account associated with the computing device. The computing device presents the data from the document via a user interface (e.g., a graphical user interface). Upon presentation of the first content, the computing device also requests and presents the second content (e.g., the 1 pixel×1 pixel data), and repeatedly re-requests the second content data. The computing device stops sending the requests for the second content data when the presentation of the first content ends. As such, the computer system repeatedly receives, from the computing device, data corresponding to each request until the end of the presentation of the first content. The data can indicate a source of the second content, where the source is associated with the account and the first content. The computer system determines the account and the first content based on the source to then generate and store contextual data. The contextual data is associated with the account and identifies, among other things, the first content and timing of the first content's presentation. Subsequently, the computer system receives, from the computing device or another computing device associated with the account, data requesting a content-related action. The computer system queries the contextual data associated with the account. The query result indicates that the first content is being presented or was previously presented within a period of time before the request for the content-related action. Accordingly, the computer system determines that the content-related action is to be performed based on the presentation of the first content and causes this action to be performed.

To illustrate, consider an example of a multi-modal device associated with an account. The computer system sends to the multi-modal device a document that includes the three above types of data either individually or in a single data object, such as a document. Accordingly, the multi-modal device presents first content corresponding to first data about a release of a new movie. The multi-modal device also presents a 1 pixel×1 pixel value corresponding to second content data available from a network address. The multi-modal device periodically requests the second content data while the first content is presented by using a uniform resource locator (URL) or any other type of source information. The computer system receives the corresponding periodic data that includes the URL. From the URL, the computer system determines a presentation identifier that is appended to the URL. The computer system also determines an account identifier and a content identifier that are associated with the presentation identifier. Next, the computer maintains, in cache, contextual data associated with the account identifier. The contextual data includes the content identifier and timestamps that correspond to the periodic image requests. While the content is being presented, a user of the multi-modal device may provide a natural language utterance requesting a trailer of the movie to be played. The utterance need not identify the movie title (e.g., this utterance can include "play the trailer"). The multi-modal device sends the corresponding audio data to the computer system. In turn, the computer system performs speech processing on the audio data. For instance, the audio data is input to an automatic speech recognition (ASR) and natural language understanding (NLU) process. This process outputs an intent for "playing trailer." The speech processing also includes performing an entity resolution process to identify the requested entity (e.g., the specific movie title). Because the audio data does not indicate an entity, the computer system queries the cache for contextual data associated with the account identifier. An example system for caching and querying contextual data is further described in FIG. 14. The query result includes the content identifier and timing data. Based on the timing data, the computer system determines that the content having the content identifier is currently presented at the multi-modal device and, accordingly, resolves the entity to be the title of the new movie. The computer system then sends instructions to the multi-modal device to play the trailer of the new movie.

Embodiments of the present disclosure provide several technological improvements. For example, the use of the second data and third data for repeatedly requesting second content from a source associated with first content and an account identifier enables scalability. In particular, such types of data can be inserted in objects sent to computing devices without necessitating changes to applications and/or browsers of the computing devices. Further, the contextual data can improve the content-related experience. For instance, the contextual data can accurately indicate the presentation of first content and the related timing. By storing the contextual data in low latency storage, such as in cache, low latency queries can be performed to timely determine the content. By also associating the contextual data with an account, multi-modal and multi-device experiences can be supported. For instance, whereas the first content is presented using a graphical user interface on a computing device, the content-related action can be requested via a voice user interface of the computing device or a user interface of another device associated with the same account. In both cases, the contextual data can be queried from the low latency storage to accurately and timely (e.g., in real-time relative to the first content being presented) determine that the content-related action is to be performed based on the presentation of the first content.

In the interest of clarity of explanation, various embodiments are described in connection with presenting content at a graphical user interface, where the content can be an image, a video, or some multimedia file that includes a graphical component. However, the embodiments are not limited as such. Instead, the embodiments similarly apply to other types of content that can be presented on other types of output modalities. For instance, the content can be audio or a multimedia file that includes an audio component, and the output modality can include an audio user interface, such as an audio speaker of a computing device. In this case, the second data can cause the computing device to request an audio file that is relatively short (e.g., a few milliseconds) or blank (e.g., has no actual content). This audio file can be output by the audio speaker. The third data can cause the computing device to repeatedly request the audio file.

Storage and/or use of contextual data related to a particular person or device may be controlled by a user using privacy controls associated with a speech-controlled device and/or a companion application associated with a speech-controlled device. Accordingly, users may opt out of storage of contextual data and/or may select particular types of contextual data that may be stored while preventing aggregation and storage of other types of contextual data. Additionally, aggregation, storage, and use of contextual information, as described herein, may be compliant with privacy controls, even if not technically subject to them, to bolster user trust. For example, contextual and other data described herein may be treated as if it fell under acts and regulations, such as the Health Insurance Portability and Accountability Act (HIPAA) and the General Data Protection Regulation (GDPR), even if it does not actually fall under these acts and regulations.

FIG. 1 illustrates an example of an environment for providing content-related actions based on contextual data, according to embodiments of the present disclosure. As illustrated, the environment includes a computer system 110 and a number of computing devices 120A, 120B through 120K. Generally, the computing devices 120A, 120B through 120K are associated with a same user account 101 and can be communicatively coupled with the computer system 110 over one more data network. Content can be presented on at least one of the computing devices 120A based on an object 112 sent from the computer system 110 to such a computing device. The presentation causes the computing device to send periodic data 122 to the computer system indicating that the content is being presented. Based on the periodic data 122, the computer system 110 maintains contextual data 114 about the presentation of the content. The contextual data 114 is usable to determine a context for performing a content-related action that can be requested by the same or a different computing device of the user account 101.

In an example, the object 112 includes three types of data: content data for requesting first content data and presenting the related first content (e.g., an advertisement) at the computing device (e.g., the computing device 120A that receives the object 112), presentation data for requesting second content data (e.g., image data) and presenting the related second content (e.g., a 1 pixel×1 pixel image) within the first content or along with the presentation of the first content, and requesting data for determining a frequency at which the second content data is to be requested. The first content data and the second content data can be stored at different sources.

Accordingly, when a computing device of the user account 101 (e.g. the computing device 120A) receives the object 112, the computing device presents different types of content indicated by the object, including the first content. Upon presentation of the first content, the presentation data causes the computing device to request the second content data and present the second content within the first content or along with the first content's presentation, whereas the requesting data causes the computing devices to repeatedly request the second content data. Such repeated requests are not made when the first content is not presented. The timing of the requests for the second content data corresponds to the timing of the first content's presentation and, as such, allows the computer system 110 to determine the presentation's timing. The periodic data 122 indicating such requests includes a presentation identifier that is associated with content identifier of the first content and, optionally, with a device identifier of the computing device that sends the periodic data 122 and/or account identifier of the user account 101. The presentation identifier allows the computer system to identify the first content that is presented by the computing device. Hence, the computer system 110 can generate the contextual data 114, where this data indicates the content identifier, the timing of the first content's presentation and, optionally, the device identifier and/or account identifier.

Subsequently, the same or a different computing device of the user account 101 (e.g., the computing device 120B or 120K) can send, to the computer system 110, content-related action data 124. Generally, content-related action data 124 can indicate an action to be performed based on content without identifying the particular content. As such, the computer system 110 can determine the content based on the contextual data 114. For example, the computer system 110 can determine that the first content is being or was recently presented on the computing device (e.g. the computing device 120A, or more generally on a computing device of the user account 101) and resolve an entity of the requested content-related action relates to be the content identifier. The computer system 110 then triggers the content-related action to be performed by sending content-related action instructions 116 to the requesting computing device of the user account 116 (as illustrated with a dotted arrow) and/or to another system associated with performing the content-related action.

Figure 2:
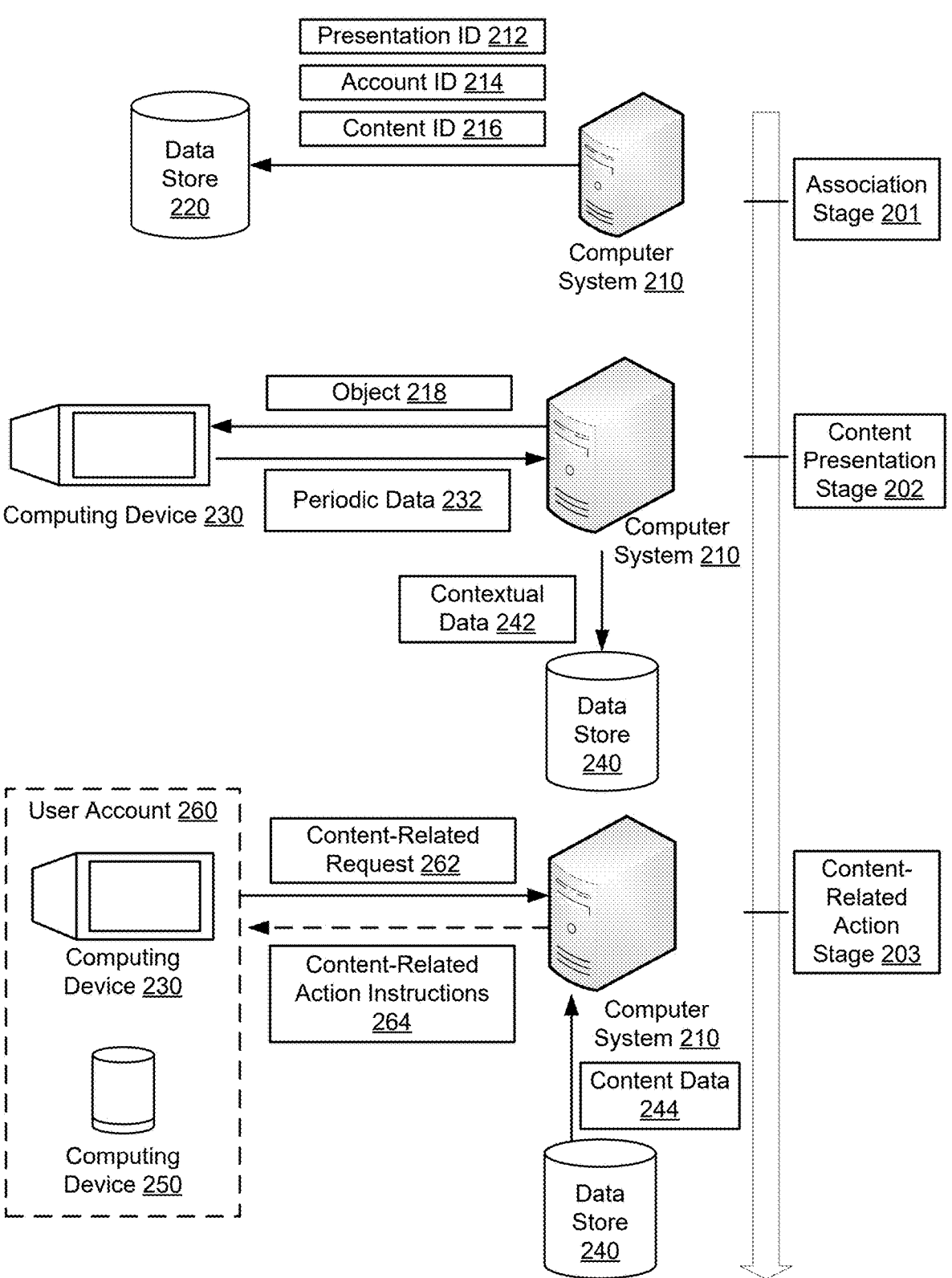
FIG. 2 illustrates a more detailed example of an environment for providing content-related actions based on contextual data, according to embodiments of the present disclosure.

FIG. 2 illustrates a more detailed example of an environment for providing content-related actions based on contextual data, according to embodiments of the present disclosure. As illustrated, the environment includes a computer system 210, a first data store 220, a computing device 230, a second data store 240, and a second computing device 250. Interactions between the different components of the environment are described in connection with three stages: an association stage 201 during which a source of insertable content is associated with an account and user-perceivable content in which the insertabled content is to be included, a content presentation stage 202 during which the user-perceivable content is presented and requests for the insertable content are periodically received such that relevant contextual data can be generated and maintained, and a content-related action stage 203 during which a content-related action can be performed based on the contextual data. A description of the components of the environment is provided herein next followed by a description of each stage.

In an example, the computer system 210 can include hardware and software suitable for implementing generating documents, contextual documents, and causing content-related actions. For instance, the computer system 210 can be implemented as a set of servers or a set of components on servers (e.g., in a datacenter and/or as a cloud-based service) that communicate with computing devices, support speech processing, and support content-related functionalities. The content-related functionalities can include any, or a combination of, streaming content (e.g., music and/or video playback), causing content purchases and/or rentals, providing web pages including product advertisements, providing product advertisements for placement in web pages generated by other computer systems (including third party systems), and causing product purchases and/or rentals (e.g., from an online marketplace).

A computing device, such as the computing device 230 or the computing device 250 can include any type of device suitable for operations by a user and that includes one or more memories, one or more processors, and one or more input/output (I/O) interfaces. For instance, the computing device can be a smart speaker that may have, but need not have, a screen, a tablet, a smart phone, a laptop, a desktop computer, a kiosk computer, a set-top box, a multimedia streaming device, an internet of things (IoT) device, or any other suitable device. The computing device may, but need not, be a multi-modal device with which the user can, for instance, interact with the computing device by using a graphical user interface and a voice user interface of the computing device. The computing device can present content on a screen (e.g., video content) and/or on a speaker (e.g., audio content). As illustrated in FIG. 2, the computing devices 230 and 250 can be associated with a same user account 260. The user account 260 can be an individual user account, such as being specific to and controlled by a user, or can be a group account, such as being specific to a group of users or a business and controlled by one or more of such users or a business administrator.

The first data store 220 can be storage on a network (e.g., cloud-based storage) and accessible remotely by the computer system 210. In comparison, the second data store 240 can be storage on a network or local storage of the computer system 210. In an example, the local second data store 240 is a low latency storage, such as a cache storage. An example of cache storage used for storing and querying contextual information is further described in FIG. 14.

Referring now to the stages, during the association stage 201, a source of insertable content is associated with the user account 260 and user-perceivable content. The user-perceivable content is typically content that can be perceived by a user, such as any type of content presentable at a user interface of a computing device (e.g., a graphical user interface or an audio user interface). For example, the user-perceivable content can be unsolicited content or recommended content, such as an advertisement, having an image format, a video format, or an audio format. In comparison, the insertable content is presented along with the presentation of the user-perceivable content but is typically not perceivable by a user. The type of insertable content can depend on the type of the user-perceivable content. For instance, if user-perceivable content is presentable at a graphical user interface, the insertable content can include a small sized image (e.g., 2 pixel×2 pixel) and being presentable in the user-perceivable content (e.g., as a pixel among the pixels of the content, where this pixel can have a default red, green, and blue (RGB) value or an RGB value derived from the pixels of the content). In comparison, if the user-perceivable content is presentable at an audio user interface, the insertable content can include an audio file that is relatively short (e.g., a few milliseconds) or blank (e.g., has no actual audio content). Both the user-perceivable content and the insertable content can be stored at a same source or at different sources. Each source can be identified using source information, such as a network address (e.g., URL). In the interest of clarity of explanation, the use of a 2 pixel×2 pixel image as the insertable content is further described herein below. The embodiments equivalently apply to other types of insertable content. The 2 pixel×2 pixel image is referred to as an image. The user-perceived content is referred to as content.

The association of the image with the user account 260 and the content can enable the computer system 210 to determine, upon a presentation of the image, that the content is presented on a computing device associated with the user account 260. In an example, the association is stored as association data in the data store 220. The association data includes a presentation identifier 212, an account identifier 214 of the user account 260, and a content identifier 216 of the content. The presentation identifier 212 can be uniquely associated with the pair of account identifier 214 and content identifier 216. In other words, the presentation identifier 212 is different from another presentation identifier associated with a different account identifier-content identifier pair. The presentation identifier 212 can be a random string or can be a hash of the account identifier 214 and the content identifier 216. In an example, the association data is stored as a key-value pair, where the key is the presentation identifier 212 and the value is the account identifier 214 and the content identifier 216.

Although FIG. 2 illustrates the presentation identifier 212 as being associated with both the account identifier and the content identifier 216, the embodiments of the present disclosure are not limited as such. Generally, the presentation identifier 212 is associated with at least the content identifier 216. This association allows the determination of the presentation of the content. The presentation identifier 212 may also be associated with the account identifier 214. This association allows the determination that the presentation is by a computing device (or a set of computing devices) that are registered with the user account 260. The presentation identifier 212 may also or alternatively be associated with a device identifier of a computing device. This association allows the determination that the presentation is by the computing device. The device identifier can be data that uniquely identifies the computing device, an application executing on the computing device, and/or presentation placement within a user interface of the computing device (e.g., a tile on a graphical user interface). Other associations with other presentation parameters (e.g., geographical location of where the presentation is occurring) are possible, whereby the presentation identifier 212 can be mapped back to the content that is being presented and to any other presentation parameters (e.g., the user account, the presenting computing device, the geographical location, etc.)

During the content presentation stage 202, the computer system 210 sends an object 218 to the computing device 230. The computer system 210 can generate the object 218 by including therein first data for presenting the content, second data for presenting the image upon the presentation of the content (referred to herein as presentation data), and third data for repeatedly requesting the image while the presentation of the content continues (referred to herein as requesting data). An example of the object 218 is further described in relation to FIG. 2. Generally, the object 218 is written according to a programming language code depending on the application of the computing device that presents the object 218. For instance, the programming language code can be A Programming Language (APL code) or HyperText Markup Language (HTML) code. The presentation data can identify the source (e.g., the network address) of the image, whereby the presentation identifier 212 can be included in the source information (e.g., the presentation identifier 212 can be appended to the URL).

The computing device 230 uses the object 218 to present data on a screen that includes a graphical user interface. When the content is presented (e.g., is in the presented view of the graphical user interface), the presentation data causes the computing device 230 to request, from the computer system 210, the image from the corresponding source. Accordingly, the computer system 210 can receive data indicating this request, where the data includes the source information (e.g., the URL). The computer system 210 can determine the presentation identifier 212 from the source information and, based on the stored association at the data store 220, can determine that the requested image is associated with the content and the user account 260. Accordingly, the computer system 210 can determine that the content is presented at a computing device associated with the user account 260.

Further, the requesting data causes the computing device 230 to periodically re-request the image as long as the content is presented. Here also, the computer system 210 can periodically receive the corresponding data (shown as periodic data 232 in FIG. 2) that includes the source information of the image. From the periodic data 232, the computer system 210 determines the presentation identifier 212 to then identify the content and the user account 260. Accordingly, the computer system 210 generates contextual data 242 that indicates that the content is presented on a computing device associated with the user account 260. For example, the contextual data 242 includes the content identifier 216 and timestamps corresponding to the periodic image requests. The contextual data 242 can also include, among other things, the account identifier 214 and/or a device identifier of the computing device 230. The computer system 210 stores the contextual data 242 in the second data store 240, where the stored contextual data 242 is associated with the account identifier 214. For instance, the contextual data 242 is stored as key-value pairs, where the key is common to the different pairs and include the account identifier 214. The value of each pair can include the content identifier 216 and a timestamp, among other information.

In addition, the computer system 210 can maintain a state of the contextual data 242. The state can indicate whether the contextual data 242 is valid or invalid. In an example where the second data store 240 is a cache, the state can be a timeout property of the cache. The timeout property can be set to true, indicating that the cached entries have timed out and, accordingly, the contextual data 242 is invalid. Otherwise, the timeout property can be set to false, indicating that the cached entries have not timed out and, accordingly, the contextual data 242 is valid. A valid state allows the computer system 210 to query the second data store 240 in order to determine the content and the related presentation timing. Generally, the state is set to valid as long as periodic data 232 continues to be received from the computing device 230 (or another computing device associated with the user account 260) at the periodic rate. However, upon determining that no periodic data has been received for a period of time from the last periodic data reception, the computer system 210 can update the state to become invalid. The period of time can be predefined to have a particular time length, such as a few minutes or a few hours.

During the content-related action stage 203, the computer system 210 can receive a content-related request 262 from one of the computing devices associated with the user account 260. For example, this content-related request 262 can be received as audio data from the computing device 230 or request data (audio or otherwise) from the computing device 250. The computer system 210 processes the received data (e.g., via a speech processor in case of audio data) to determine that a content-related action is requested. In case the processing of the received data does not identify the specific content (e.g., an entity resolution process of the speech processor does not identify the entity), the computer system 210 can rely on the contextual data 242 for this identification. In particular, the computer system 210 can determine the contextual data 242 that is associated with the account identifier 214 and the state of the stored contextual data 242. If the state is valid, the computer system 210 can query the second data store 240 using the account identifier 214. In response, the second data store 240 can return, as a query result, content data 244 that includes, among other things, the content identifier 216. If the state is invalid, the content may not be identified from the stored contextual data 242. In this case, the computer system 210 can send instructions to the computing device to request additional user input that identifies the content (e.g., by sending a text-to-speech message and related presentation instructions, where this message requests the user to identify the content). Once the content is identified, the computer system 210 causes the content-related action to be performed. Different types of content-related actions are possible depending on the type of content and/or the type of the content-related request 262. For example, the content can be about a release of a new movie, and the content-related request 262 can be to play a trailer or to purchase the new movie. If the trailer is requested, the computer system 210 can send content-related action instructions 264 to the computing device to play the trailer. These instructions can identify the source information (e.g., URL) of the trailer. If the purchase is requested, the computer system 210 can send instructions to a marketplace system that offers the movie, where the instructions can include the account identifier 214 and the content identifier 216 (or some other identifier of the movie). The instructions cause the marketplace system to determine the user account 260, determine a payment instrument associated with the account, perform a payment process, and update the user account 260 to indicate the purchase, among other things.

Generally, the content-related action can be any type of action performable based on the presentation of the content and can be performed on the content, on related content, or an item indicated in the content and/or related content. This action can be performed on any, or a combination, of the computing devices (in, which case, the computer system 210 sends the content-related action instructions 264 to the computing device(s)), on the computer system 210, on another system (such as the marketplace system or a third party system). The content-related action can include presenting related content (e.g., the movie or the trailer of the movie), acquiring the related content (e.g., purchasing or renting the movie), storing the related content in association with the user account 260 (e.g., adding the movie to a wish list or to a shopping cart), or performing some other action related to the content.

Figure 3:
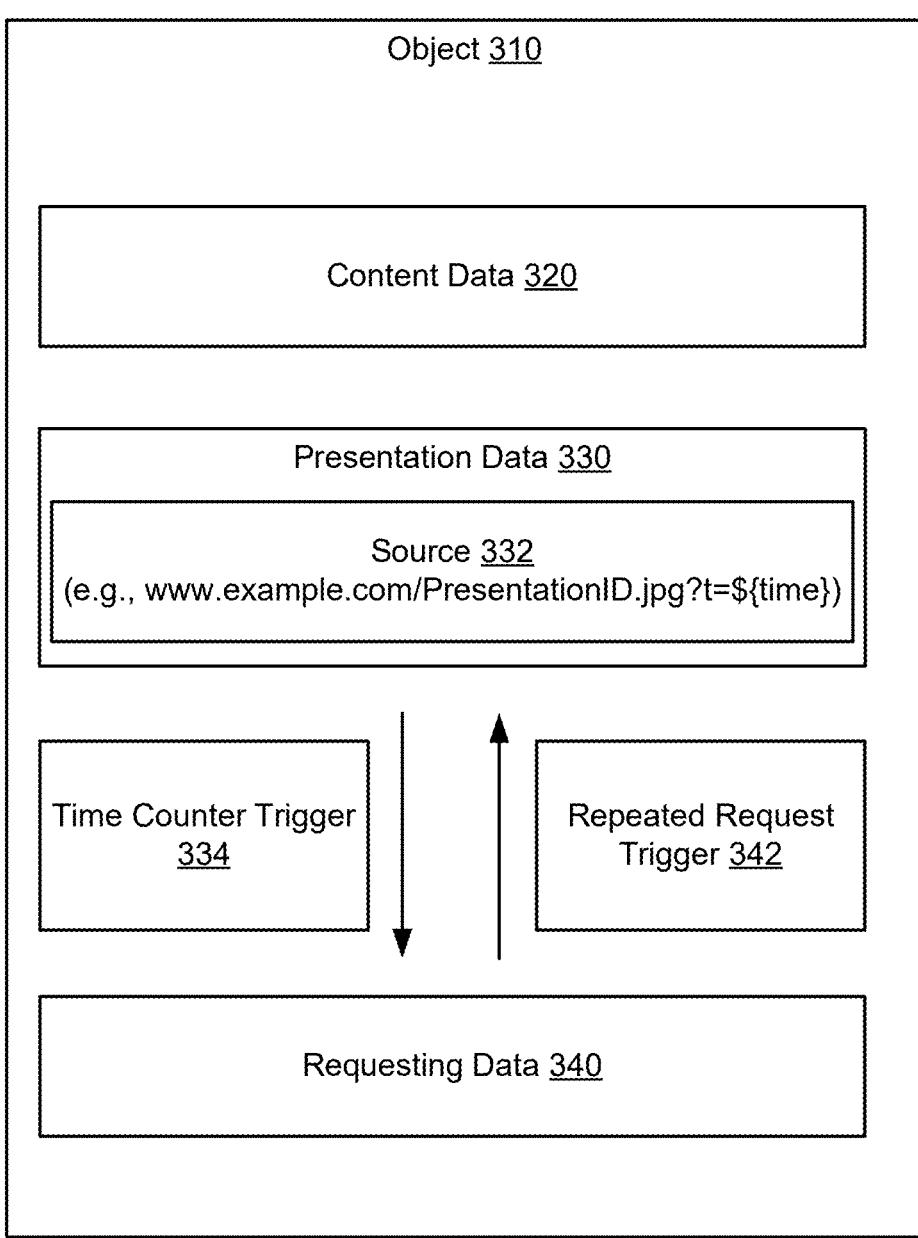
FIG. 3 illustrates an example of an object that can be sent to a computing device and used in content presentation by the computing device, where the object enables a detection of content that is being presented at the computing device, according to embodiments of the present disclosure.

FIG. 3 illustrates an example of an object 310 that can be sent to a computing device and used in content presentation by the computing device, where the object 310 enables a detection of content that is being presented at the computing device, according to embodiments of the present disclosure. The object 310 can be generated by a computer system, such as the computer system 210 of FIG. 2. The computing device can be associated with an account, such as the computing device 230 associated with the user account 260.

Generally, the object 310 can be used in association with one or more output modalities of the computing device, such as a graphical user interface or an audio user interface. The object 310 is written in a programming language, such as APL or HTML, to support the presentation at the output modality(ies). In the case of APL, the object 310 is an APL document, such as a JavaScript Object Notation (JSON) object that defines a template to present on a device with a screen. The APL document controls the structure and layout. The APL document is sent to the device with presentation instructions (which can also be referred to as a presentation or rendering directive). In the case of HTML, the object 310 is an HTML document, such as a file containing hypertext markup language using tags to provide formatting and presentation instructions. An executable script, such as a JavaScript or any other script written according to the ECMAScript specification, can additionally be included in the HTML document.

In an example, the object 310 includes data that causes (i) a presentation of the content on the device and (ii) repeated requests (e.g., periodic requests) of the image by the device. For example, the object 310 includes, among other things, content data 320, presentation data 330, and requesting data 340. The content data 320 is usable by an application executing on the computing device (e.g., a renderer in the case of an APL document or a browser in the case of an HTML document) to present content (e.g., in a space at a graphical user interface or within an audio segment). The presentation is triggered when the space is in a view portion on the screen or when the audio segment is being played by an audio speaker.

The presentation data 330 is usable by the application to request an image (e.g., a 1 pixel×1 pixel image) from a source and present the image in the content (e.g., as a 1 pixel×1 pixel value in the presented pixels that correspond to the content) or another portion of the object. For instance, the image is presented as a graphic with dimensions of 1 pixel×1 pixel. The presentation data 330 can define the presentation layout (e.g., the height and width of the graphic) and a source 332 from which the image can be retrieved (e.g., by including a link, such as a URL, that identifies network address of the network storage). As explained herein above, the image is one example of insertable content. Other types of insertable content are possible. For instance, the insertable content can also or alternatively be an audio file available from the same or a different source. Here, the presentation data 330 can also include the source 332 and can define the timing, volume, or any other parameter for presenting the audio file.

In an example, the network address indicated by the source 332 includes a presentation identifier and, optionally, a value of a time counter. As described herein above in FIG. 2, the presentation identifier can be associated with an account identifier of the account and a content identifier of the content. The time counter can be maintained by the requesting data 340. The value of the time counter can be a timestamp or indicate a time at which the request for the image is made. In the illustration of FIG. 3, the presentation identifier and, optionally, the time counter's value are appended to the URL.

The requesting data 340 causes the computing device to send repeated requests for the insertable content. Generally, the requesting data 340 indicates a frequency at which repeated requests are to be made. This frequency can correspond to the frequency at which the requests are received by the computer system (e.g., the frequency at which periodic data 232 of FIG. 2 is received by the computer system 110). In an example, the requesting data 340 is usable by the application to update the time counter and, upon the value of the time counter indicating the end of a periodic time interval, request the image again by using the network address. The length of the periodic time interval can be stored in the requesting data 340, where this length can be 5 milliseconds, 100 milliseconds, 1 second, 3 seconds, or some other time length.

Here, periodic requests are described and a time counter is used to periodically trigger such requests. However, the embodiments of the present disclosure are not limited to periodic requests. Instead, the embodiments apply to repeated requests of the image (or, more generally, insertable content). The trigger to re-request the image can be, but need not be limited to being, time-based (e.g., on a periodic basis). For instance, the trigger can include any or a combination of the amount of processing that is being used on the computing device (e.g., central processing unit (CPU) usage), the amount of available memory, the number of processes that the computing device is executing, the number and/or type of applications that the computing device is executing, or the number and/or placement (e.g., graphical user interface placement within a graphical user interface on a screen) of content that the computing device is presenting.

As illustrated in FIG. 3, the presentation data 330 can trigger the requesting data 340 to start and/or end the time counter. A trigger to start the time counter can be the presentation of the content in the view portion of the object 310, whereby the presentation data 330 presents the image too. A trigger to end the timer counter can be that the content is no longer presented and/or that the portion of the object where the content was presented is no longer in view. These triggers are illustrated in FIG. 3 as a time counter trigger 334.

When triggered to start the time counter, the requesting data 340 can initialize the value of the time counter (e.g., to zero or a current time) and then increment the value until the trigger to end the time counter is received. Upon detecting that the value corresponds to a multiplier of the periodic time interval, the requesting data 340 can trigger the presentation data 330 to request the image again. This trigger is illustrated in FIG. 3 as a repeated request trigger 342 and can include the value of the time counter. Upon the repeated request trigger 342, the presentation data 330 can cause the application to request the image again. Here also, the application uses the network address of the image. In case the network address includes a value of the time counter (e.g., this value being appended to the URL), this value is updated to correspond to the latest value of the time counter. In the illustration of FIG. 3, the URL is shown as www.example-.com/PresentationID.jpg?t=${time}. Here, the "PresentationID" corresponds to the presentation identifier. Further, the "t=${time}" corresponds to the latest value of the time counter. Of course, the time value need not be appended to the URL. Other means can be used to determine timing associated with the request. For example, the time at which the request is received by the computer system can be set as a timestamp of the request.

An example of APL object that includes the pixel presentation data and the requesting data is as following:

```
"description": "presentation pixel"
"type": "Image",
"id": "Display Content Presentation URL",
"source": "https:// www.example.com/PresentationID.jpg?t=${time}",
"height": "1px",
"width": "1px",
"bind" : [
    {
        " name": "timeHelper",
        "value": 0
    },
    {
        "name": "time"',
        "vatue": 0
    },
]
// Heartbeat
"handleTick": [
    {
        "commands": [
            {
                "type": "SetValue",
                "property": "timeHelper",
                "value" : "${timeHelper + 1}"
            },
            {
                "when": "${ timeHelper %% 5000 == 0}",
                "type": "SetValue",
                "property": "time",
                "value" : "${timeHelper}"
            },
        ]
    }
]
```

Figure 4:
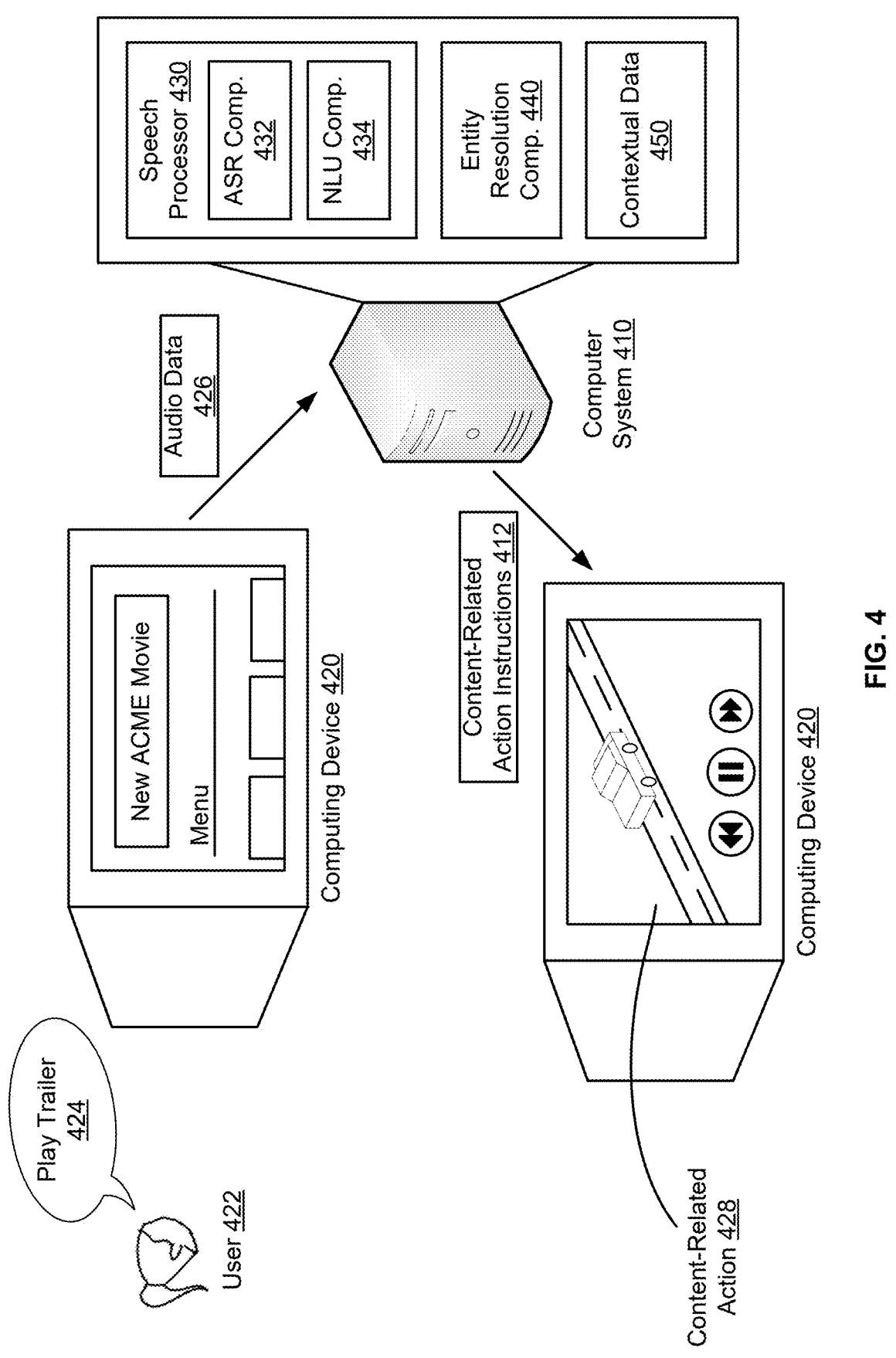
FIG. 4 illustrates an example of performing a content-related action on a multi-modal device based on contextual data, according to embodiments of the present disclosure.

FIG. 4 illustrates an example of performing a content-related action on a multi-modal device based on contextual data, according to embodiments of the present disclosure. As illustrated, a computer system 410 is communicatively coupled with a computing device 420 over a data network (not shown). The computing device 420 can present, at a screen thereof, different types of content based on an object sent by the computer system 410. The object, which is an example of the object 310 of FIG. 3, can correspond to a home page that enables different functionalities (e.g., to stream movies, search for movies, download an application, launch an application, etc.). The object can indicate content that advertises the release of a new movie (shown as "New ACME Movie"). A user 422 can provide natural language utterance 424 that an audio front end of the computing device 420 detects. The natural language utterance 424 can request content-related action without specifically identifying the content on which this action is to be performed (FIG. 4 shows a "play trailer" request as an example of the natural language utterance 424). The computing device 420 sends, to the computer system 410, audio data 426 that corresponds to the natural language utterance 424. In response, the computer system 410 processes the audio data 426 by using a speech processor 430 and an entity resolution component 440. Assuming that the content is not identifiable based on the processing of the audio data 426, the computer system

410 can rely on contextual data 450 to identify the content and cause the content-related action to be performed at the computing device 420. In the illustration of FIG. 4, the computer system 410 sends content-related action instructions 412 to the computing device 420, triggering the computing device 420 to perform the relevant content-related action 428 (shown in FIG. 4 as presenting the trailer of the new movie on the screen).

In an example, the natural language utterance 424 may include a wakeword (e.g., "Alexa," "Echo," or some other wakeword depending on the type and/or a user setting of the computing device 420). Upon detecting the wakeword, the computing device 420 generates the audio data 426 as detected by the acoustic front end and sends this audio data 426 to the computer system 410 over the data network.

The computer system 410 processes the audio data 426 via the speech processor 430. For instance, the audio data is used as input to an ASR and NLU process of the speech processor 430. Generally, the speech processor 430 provides speech processing functionalities. ASR and NLU, used in combination, are an example of speech processing. ASR on its own can also be an example of speech processing. The speech processor 430 can additionally or alternatively use other speech processing techniques, such ones involving audio-to-intent/meaning representation (e.g., end-to-end models that effectively perform the functionalities of both ASR and NLU in one step/model/component rather than have two separate steps for transcription and then meaning of transcription). As illustrated in FIG. 4, an ASR component 432 of the speech processor 430 can output text data based on the audio data 426. The text data is input to an NLU component 434 of the speech processor 430. This NLU component 434 outputs NLU data based on the text data including, for instance, an intent for a content-related action (e.g., "intent::trailer presentation"). The entity resolution component 440, which may, but need not, be a component of the speech processor 430, may identify an entity that is a target of the intent. The entity resolution can be performed first based on the NLU data and the text data (e.g., based on portions, or slots, of the text identified in the text data and their associated properties identified in the NLU data). If unsuccessful using the text data and the NLU data, the entity resolution component 440 can identify the entity based on the contextual data 450, assuming that the contextual data 450 is valid. For instance, the contextual data 450 is stored in a data store (e.g., the second data store 240 of FIG. 2) and a query is made to the data store. The query includes an account identifier of the account associated with computing device 420. The query result can identify the advertisement. The computer system 410 determines an association between the advertisement and the particular entity (e.g., the movie title). By determining that the timing is current (e.g., the advertisement is currently presented) or recent (e.g., the advertisement was last presented less than a minute ago), the entity is resolved to be the movie title.

At this point, the computer system 410 has determined the intent (e.g., to play trailer) and has resolved the entity (e.g., the movie title). Accordingly, the computer system 410 sends the content-related action instructions 412 to the computing device 420. Such content-related action instructions 412 indicate a source from which the trailer is available (e.g., by including the relevant URL) and request the computing device 420 to play the trailer.

Figure 5:
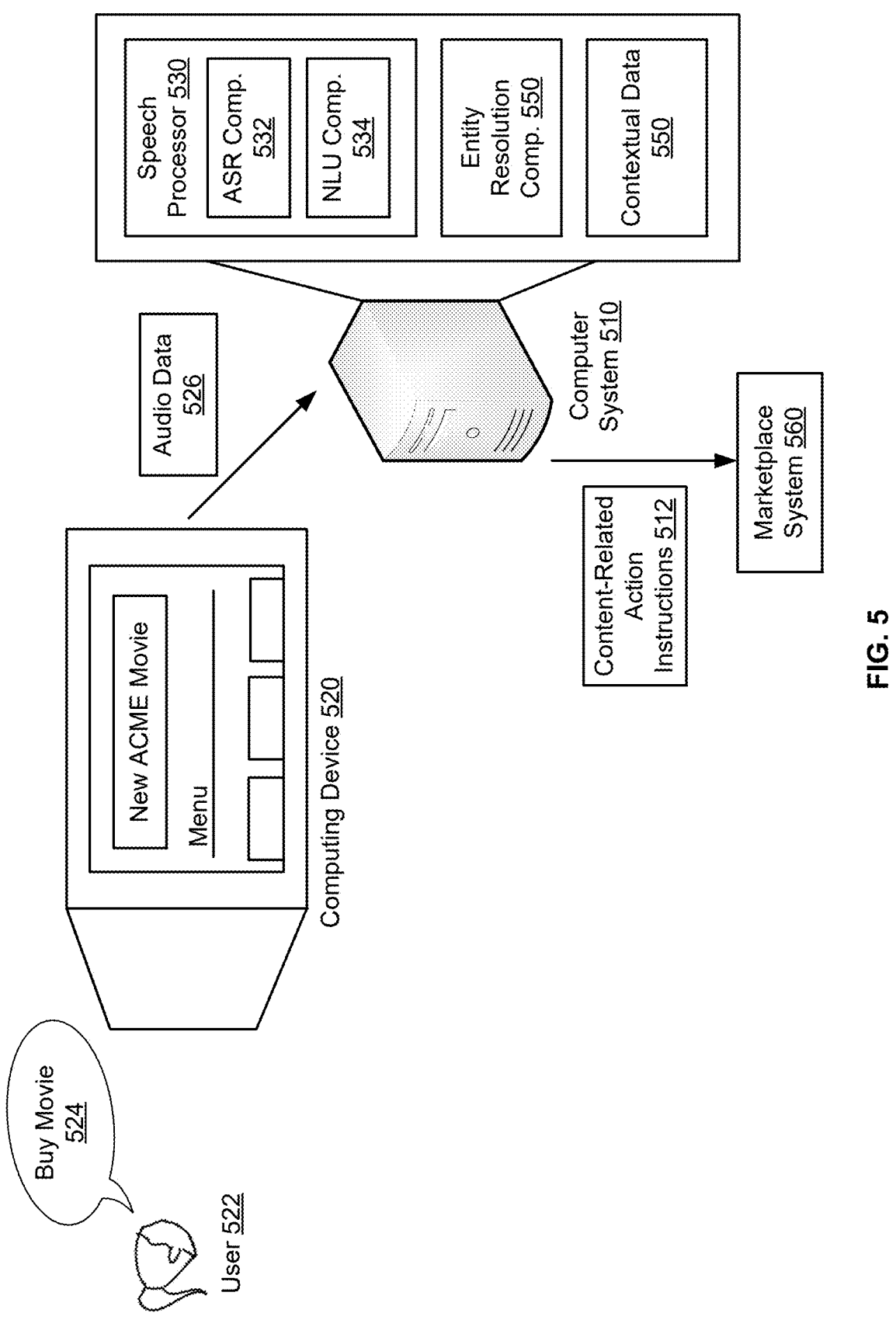
FIG. 5 illustrates an example of performing a content-related action upon a request from a multi-modal device based on contextual data, according to embodiments of the present disclosure.

FIG. 5 illustrates an example of performing a content-related action upon a request from a multi-modal device based on contextual data, according to embodiments of the present disclosure. Whereas in FIG. 5, the content-related action is performed on the multi-modal device, the content related action herein can be performed remotely from such a device.

As illustrated, a computer system 510 is communicatively coupled with a computing device 520 over a data network (not shown). The computing device 520 can present, at a screen thereof, different types of content based on an object sent by the computer system 510. The object, which is an example of the object 310 of FIG. 3, can correspond to a home page that enables different functionalities (e.g., to stream movies, search for movies, download an application, launch an application, etc.). The object can indicate content that advertises the release of a new movie (shown as "New ACME Movie"). A user 522 can provide natural language utterance 524 that an audio front end of the computing device 520 detects. The natural language utterance 524 can request content-related action without specifically identifying the content on which this action is to be performed (FIG. 5 shows a "buy movie" request as an example of the natural language utterance 524). The computing device 520 sends, to the computer system 510, audio data 526 that corresponds to the natural language utterance 524. In response, the computer system 510 processes the audio data 526 by using a speech processor 530 and an entity resolution component 540. Assuming that the content is not identifiable based on the processing of the audio data 526, the computer system 510 can rely on contextual data 550 to identify the content and cause the content-related action to be performed at a marketplace system 560. In the illustration of FIG. 5, the computer system 510 sends content-related action instructions 512 to the marketplace system 560, triggering the marketplace system 560 device to perform the relevant content-related action (e.g., to process a purchase of the movie).

In an example, the natural language utterance 524 may include a wakeword (e.g., "Alexa," "Echo," or some other wakeword depending on the type and/or a user setting of the computing device 520). Upon detecting the wakeword, the computing device 520 generates the audio data 526 as detected by the acoustic front end and sends this audio data 526 to the computer system 510 over the data network.

The computer system 510 processes the audio data 526 via the speech processor 530. For instance, the audio data is used as input to an ASR and NLU process of the speech processor 530. As illustrated in FIG. 5, an ASR component 532 of the speech processor 530 can output text data based on the audio data 526. The text data is input to an NLU component 534 of the speech processor 530. This NLU component 534 outputs NLU data based on the text data including, for instance, an intent for a content-related action (e.g., "intent::purchase"). The entity resolution component 540, which may, but need not, be a component of the speech processor 530, may identify an entity that is a target of the intent. The entity resolution can be performed first based on the NLU data and the text data (e.g., based on portions, or slots, of the text identified in the text data and their associated properties identified in the NLU data). If unsuccessful using the text data and the NLU data, the entity resolution component 540 can identify the entity based on the contextual data 550, assuming that the contextual data 550 is valid. For instance, the contextual data 550 is stored in a data store (e.g., the second data store 240 of FIG. 2) and a query is made to the data store. The query includes an account identifier of the account associated with computing device 520. The query result can identify the advertisement. The computer system 510 determines an association between the advertisement and the particular entity (e.g., the movie title).

By determining that the timing is current (e.g., the advertisement is currently presented) or recent (e.g., the advertisement was last presented less than a minute ago), the entity is resolved to be the movie title.

At this point, the computer system 510 has determined the intent (e.g., to purchase) and has resolved the entity (e.g., the movie title). Accordingly, the computer system 510 sends the content-related action instructions 512 to the marketplace system 560. Such instructions indicate the account identifier and the entity, among other information about the account and the movie. The instructions cause the marketplace system 560 to determine the account, determine a payment instrument associated with the account, perform a payment process, and update the account to indicate the purchase of the movie title, among other operations.

Figure 6:
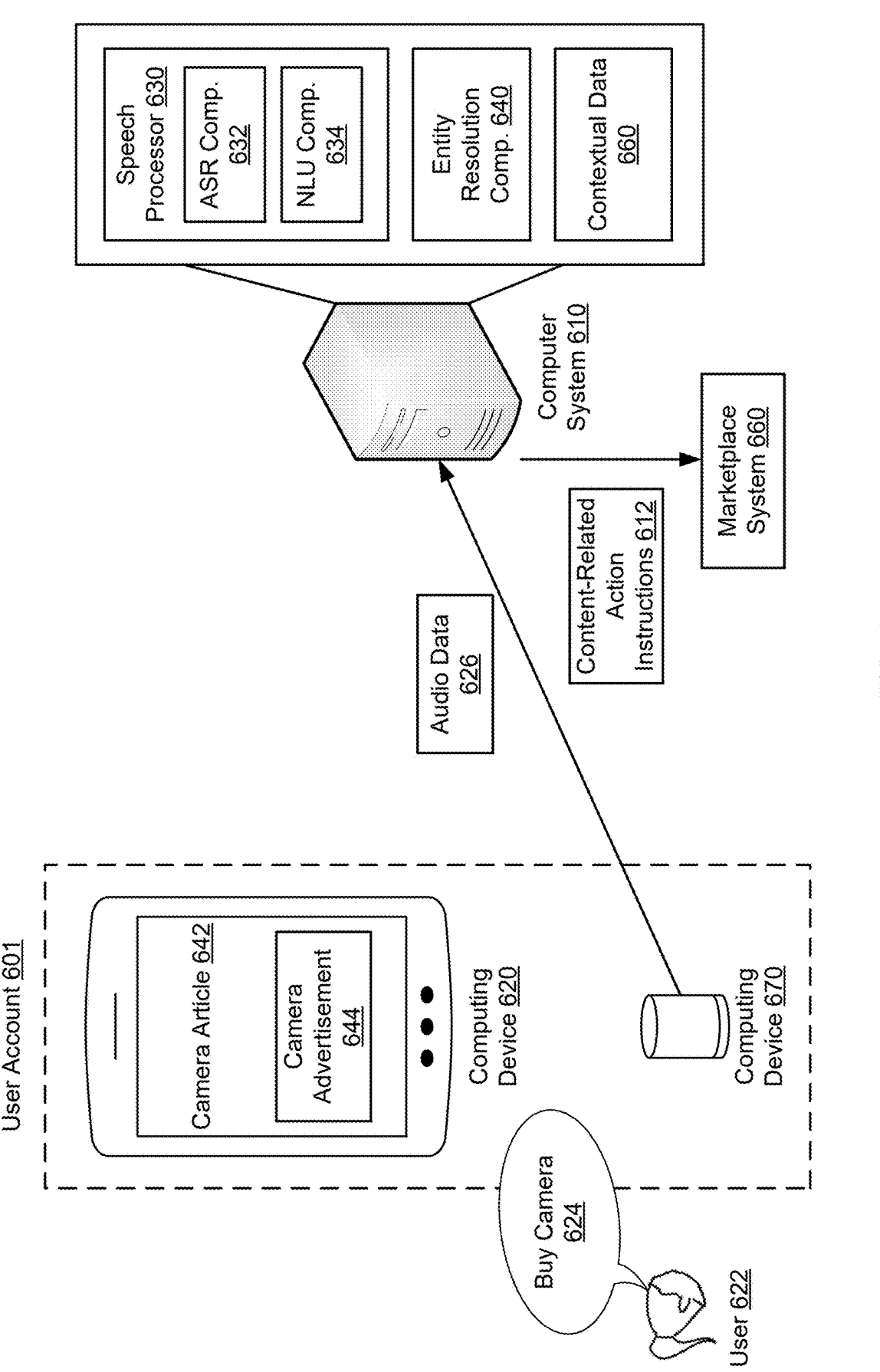
FIG. 6 illustrates an example of performing a content-related action based on contextual data, where content is presented on a first computing device and a request for the content-related action is received from a second computing device, according to embodiments of the present disclosure.

FIG. 6 illustrates an example of performing a content-related action based on contextual data, where content is presented on a first computing device and a request for the content-related action is received from a second computing device, according to embodiments of the present disclosure. The first computing device may, but need not, be multi-modal. Similarly, the second computing device may, but need not, be multi-modal. The two computing devices are associated with a same account. The content is presented on a screen of the first computing device. Speech input is received at the second computing, where this input requests the content-related action. This requested action is performed based on the content that is presented on the first computing device.

As illustrated, a computer system 610 is communicatively coupled with a first computing device 620 and a second computing device 670 over a data network (not shown). The two computing devices 620 and 670 are associated with a same user account 601. The first computing device 620 can present, at a screen thereof, different types of content based on an object sent by the computer system 610. The object, which is an example of the object 310 of FIG. 3, can correspond to a web page (illustrated in FIG. 6, as a web article 642 about a camera) and can indicate an advertisement about an item (e.g., illustrated in FIG. 6 as a camera advertisement 644 about a particular camera model). A user 622 can provide natural language utterance 624 that an audio front end of the second computing device 670 detects. The natural language utterance 624 can request content-related action without specifically identifying the content on which this action is to be performed (FIG. 6 shows a "buy camera" request as an example of the natural language utterance 624). The second computing device 670 sends, to the computer system 610, audio data 626 that corresponds to the natural language utterance 624. In response, the computer system 610 processes the audio data 626 by using a speech processor 630 and an entity resolution component 640. Assuming that the content is not identifiable based on the processing of the audio data 626, the computer system 610 can rely on contextual data 650 to identify the content and cause the content-related action to be performed at a marketplace system 660. In the illustration of FIG. 6, the computer system 610 sends content-related action instructions 612 to the marketplace system 660 triggering the marketplace system 660 device to perform the relevant content-related action (e.g., to process a purchase of the particular camera model).

In an example, the natural language utterance 624 may include a wakeword (e.g., "Alexa," "Echo," or some other wakeword depending on the type and/or a user setting of the second computing device 670). Upon detecting the wakeword, the second computing device 670 generates the audio data 626 as detected by the acoustic front end and sends this audio data 626 to the computer system 610 over the data network.

The computer system 610 processes the audio data 626 via the speech processor 630. For instance, the audio data is used as input to an ASR and NLU process of the speech processor 630. As illustrated in FIG. 6, an ASR component 632 of the speech processor 630 can output text data based on the audio data 626. The text data is input to an NLU component 634 of the speech processor 630. This NLU component 634 outputs NLU data based on the text data including, for instance, an intent for a content-related action (e.g., "intent::purchase"). The entity resolution component 640, which may, but need not, be a component of the speech processor 630, and/or may identify an entity that is a target of the intent. The entity resolution can be performed first based on the NLU data and the text data (e.g., based on portions, or slots, of the text identified in the text data and their associated properties identified in the NLU data). If unsuccessful using the text data and the NLU data, the entity resolution component 640 can identify the entity based on the contextual data 650, assuming that the contextual data 650 is valid. For instance, the contextual data 650 is stored in a data store (e.g., the second data store 240 of FIG. 2) and a query is made to the data store. The query includes an account identifier of the user account 601. The query result can identify the advertisement. The computer system 610 determines an association between the advertisement and the camera model (e.g., a product identifier of the camera model). By determining that the timing is current (e.g., the advertisement is currently presented) or recent (e.g., the advertisement was last presented less than a minute ago), the entity is resolved to be the particular camera model.

At this point, the computer system 610 has determined the intent (e.g., to purchase) and has resolved the entity (e.g., the camera model). Accordingly, the computer system 610 sends the content-related action instructions 612 to the marketplace system 660. Such instructions indicate the account identifier and the entity, among other information about the account and the particular camera model. The instructions cause the marketplace system 660 to determine the account, determine a payment instrument associated with the account, perform a payment process, and update the account to indicate the purchase of the camera model, among other operations.

Although FIG. 6 illustrates that a voice user interface is used at the second computing device 670 whereby speech input and corresponding audio data are processed, the embodiments of the present disclosure are not limited as such. For example, the content-related action can be requested via a graphical user interface of the second computing device 670. For instance, while the camera article 642 of the camera advertisement 644 are presented at the first computing device 620, or within a period of time after the completion of the presentation (e.g., a minute or any other time length corresponding to the time period during which the context data 650 remains valid), one or more graphical user interface elements can be presented on one or more screens of one or more other computing devices associated with the user account 601. When presented at a graphical user interface of a computing device, a graphical user interface element can be selected (e.g., via a tap on a touchscreen that provides the graphical user interface, or via a double-click on the graphical user interface element received from a mouse or some other type of input device). This selection can trigger the computing device to send data (e.g., structured data) requesting the content-related action (e.g., to purchase) without identifying the specific content or advertisement item. In this case, the computer system 110 can receive and process this data. Here, the processing need not involve the ASR component 632 and/or the NLU model 634. Instead, the contextual data 650 can be queried to determine the content (e.g., the advertisement) and, accordingly, determine the item (e.g., the particular camera model).

Figure 7:
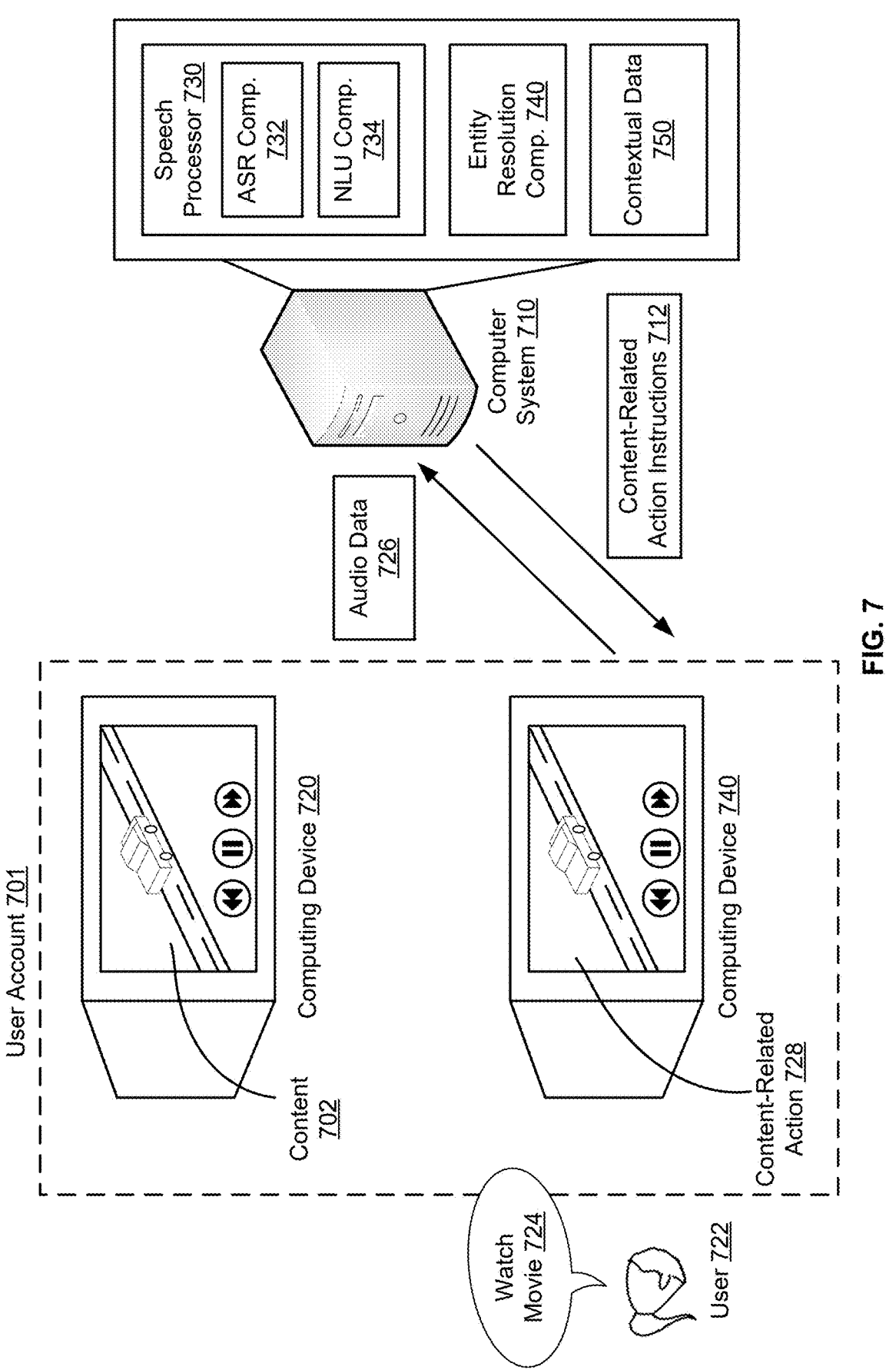
FIG. 7 illustrates another example of performing a content-related action based on contextual data, where content is presented on a first computing device and a request for the content-related action is received from a second computing device, according to embodiments of the present disclosure.

FIG. 7 illustrates another example of performing a content-related action based on contextual data, where content is presented on a first computing device and a request for the content-related action is received from a second computing device, according to embodiments of the present disclosure. The first computing device may, but need not, be multi-modal. Similarly, the second computing device may, but need not, be multi-modal. The two computing devices are associated with a same account. Here, the content can be solicited content that a user has requested. The first computing device performs a first content-related action, such as presenting the content. Subsequently, the user requests a second content-related action to be performed on the second computing device. The first content-related action and the second content-related action are of the same type, albeit being performed on different computing devices. Contextual data is used to determine that this request relates to the same content. Accordingly, the second computing device is instructed to perform the requested action on the content.

As illustrated, a computer system 710 is communicatively coupled with a first computing device 720 and a second computing device 740 over a data network (not shown). The two computing devices 720 and 740 are associated with a same user account 701. The first computing device 720 can present, at a screen thereof, content 702 (e.g., shown as a movie) according to an object sent by the computer system 710 (playing the movie on the first computing device 720 is an example of the first content-related action). The object, which is an example of the object 310 of FIG. 3, can identify the content, the format, and layout of the content's presentation. The object can also include presentation data that inserts a small image (e.g., a 1 pixel×1 pixel image) in the presentation of the content and requesting data to repeatedly request the small image. The network address of the image is associated with the user account 701 and the content 702 (e.g., the network address includes a presentation identifier associated with an account ID of the user account 701 and a content identifier of the content 702). In addition, the requesting data can maintain a time counter indicating a time progress of the content 702 during presentation (e.g., time-stamps corresponding to video frames of the movie). Values of the time counter can be included in the image request as described in FIG. 3. Accordingly, contextual data 750 maintained by the computer system 710 can identify the content 702 and the time progress of the content's 702 presentation.

A user 722 can provide natural language utterance 724 that an audio front end of the second computing device 740 detects. The natural language utterance 724 can request a second content-related action without specifically identifying the content on which this action is to be performed (FIG. 7 shows a "watch movie" request as an example of the natural language utterance 724). The second computing device 740 sends, to the computer system 710, audio data 726 that corresponds to the natural language utterance 724. In response, the computer system 710 processes the audio data 726 by using a speech processor 730 and an entity resolution component 740. Assuming that the content is not identifiable based on the processing of the audio data 726, the computer system 710 can rely on the contextual data 750 to identify the content and cause the second content-related action to be performed at the second computing device 740. In the illustration of FIG. 7, the computer system 710 sends content-related action instructions 712 to the second computing device 740, thereby triggering the second computing device 740 to perform the second content-related action 728 (shown in FIG. 7 as playing the movie on the screen of the second computing device 740).

In an example, the natural language utterance 724 may include a wakeword (e.g., "Alexa," "Echo," or some other wakeword depending on the type and/or a user setting of the second computing device 740). Upon detecting the wakeword, the second computing device 740 generates the audio data 726 as detected by the acoustic front end and sends this audio data 726 to the computer system 710 over the data network.

The computer system 710 processes the audio data 726 via the speech processor 730. For instance, the audio data is used as input to an ASR and NLU process of the speech processor 730. As illustrated in FIG. 7, an ASR component 732 of the speech processor 730 can output text data based on the audio data 726. The text data is input to an NLU component 734 of the speech processor 730. This NLU component 734 outputs NLU data based on the text data including, for instance, an intent for a content-related action (e.g., "intent::video playback"). The entity resolution component 740, which may, but need not, be a component of the speech processor 730, may identify an entity that is a target of the intent. The entity resolution can be performed first based on the NLU data and the text data (e.g., based on portions, or slots, of the text identified in the text data and their associated properties identified in the NLU data). If unsuccessful using the text data and the NLU data, the entity resolution component 740 can identify the entity based on the contextual data 750, assuming that the contextual data 750 is valid. For instance, the contextual data 750 is stored in a data store (e.g., the second data store 240 of FIG. 2) and a query is made to the data store. The query includes an account identifier of the user account 701. The query result can identify the content 702. By determining that the timing is current (e.g., the content 702 is currently presented) or recent (e.g., the content 702 was last presented less than a minute ago), the entity is resolved to be the particular content (e.g., the movie title). Based on the timing data included in the contextual data (e.g., the different time stamps), the computer system 710 can also determine the time progress of the content's 702 presentation on the first computing device 720. Accordingly, the computer system can identify a timestamp (or a video frame) at which the presentation of the content 702 can start on the second computing device 740.

At this point, the computer system 710 has determined the intent (e.g., to video playback), has resolved the entity (e.g., the movie title), and determined the start point of the presentation on the second computing device 740. Accordingly, the computer system 710 sends the content-related action instructions 712 to the second computing device 740. Such instructions 712 indicate a network storage from which the content 702 is available (e.g., by including the relevant URL), request the second computing device 770 to play the movie, and indicate the start point of the movie playback.

Although FIG. 7 illustrates that a voice user interface is used at the second computing device 740 whereby speech input and corresponding audio data are processed, the embodiments of the present disclosure are not limited as such. For example, the content-related action can be requested via a graphical user interface of the second computing device 740. For instance, while the content 702 is presented at the first computing device 720, or within a period of time after the completion of the presentation (e.g., a minute or any other time length corresponding to the time period during which the context data 750 remains valid), one or more graphical user interface elements can be presented on one or more screens of one or more other computing devices associated with the user account 701. When presented at a graphical user interface of a computing device, a graphical user interface element can be selected (e.g., via a tap on a touchscreen that provides the graphical user interface, or via a double-click on the graphical user interface element received from a mouse or some other type of input device). This selection can trigger the computing device to send data (e.g., structured data) requesting the content-related action (e.g., for a movie playback) without identifying the specific content. In this case, the computer system 110 can receive and process this data. Here, the processing need not involve the ASR component 732 and/or the NLU model 734. Instead, the contextual data 750 can be queried to determine the content (e.g., the movie title) and the time point and, accordingly, send the content-related instructions 712 to the computing device.

FIGS. 8-11 illustrate examples of flows for generating and maintaining contextual data to support content-related actions. Operations of the flows can be performed by a computer system, such as the computer system 210 of FIG. 2. Some or all of the instructions for performing the operations can be implemented as hardware circuitry and/or stored as computer-readable instructions on a non-transitory computer-readable medium of the computer system. As implemented, the instructions represent components that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 8 illustrates an example of a flow 800 for generating and sending an object to a computing device such that the computing device can present user-perceived content and repeatedly request insertable content, according to embodiments of the present disclosure. The object is an example of the object 310 of FIG. 3. The user-perceived content is referred to herein as first content, whereas the insertable content is referred to herein as second content.

As illustrated, the flow 800 may start at operation 802, where the computer system generates a presentation identifier. In an example, the presentation identifier is unique to a content identifier of first content. As explained herein above, the presentation identifier can also be unique to other parameters, such as to an account and/or a computing device. The presentation identifier can be generated by using a random generator or by using a hash function where, for instance, the content identifier and, optionally, an account identifier of the account and/or a device identifier of the computing device are input to the hash function. The presentation identifier, the second content, or the object can be generated upon request from the computing device associated with the account identifier (e.g., upon a web request for a web page, where the object corresponds to the web page, or upon an application programming interface (API) call or some other type of request of an application for an APL document).

In an example, the flow 800 may include operation 804, where the computer system associates the presentation identifier with the content identifier. The presentation identifier can also be associated with the account identifier and/or the device identifier. In an example, the presentation identifier, the content identifier, and, optionally, the account identifier and/or the device identifier are stored in a data store. The data store may also store the association between these identifiers or the storage format may on its own indicate the association. For instance, the identifiers are stored as a set of key-value pairs. A key includes the presentation identifier. A value includes the content identifier and, optionally, the account identifier and/or the device identifier.

In an example, the flow 800 may also include operation 806, where the computer system stores second content (e.g., insertable content) at a source having source information that includes the presentation identifier. In an example, the insertable content is a 1 pixel×1 pixel image and/or short or blank audio file. The source information can include a URL of the source (or any other type of information to identify the source) where the 1 pixel×1 pixel image and/or short or blank audio file are stored. The presentation identifier can be appended to the URL.

In an example, the flow 800 may also include operation 808, where the computer system generates an object having data for presenting the first content and for repeatedly requesting the second content. In an example, the object is generated using a programming language, such as APL or HTML and includes data that causes (i) a presentation of the first content on the computing device and (ii) repeated requests of the second content by the device. For instance, the object includes content data for presenting the first content (e.g., in a space when this space is in view, or within an audio segment when the audio segment is being played). The object also includes presentation data that requests and presents the second content (e.g., the 1 pixel×1 pixel image or the short or blank audio file) in the first content. Further, the object includes requesting data for repeatedly requesting the second content while the presentation of the first content continues.

In an example, the flow 800 may also include operation 810, where the computer system sends the object to the computing device. In an example, upon receiving a request (e.g., web request, API call, or another type of request) from the computing device for the object, the computer system sends the object to the computing device. In response, the computing device presents, based on the object, different types of content via, for example, a graphical user interface on a screen and/or an audio user interface on an audio speaker. When the first content is presented, the presentation data causes the computing device to request, receive, and present the second content. The presentation of the second content and/or of the first content can trigger the requesting data to cause the computing device to repeatedly request the second content. As described in the next figures, the computer system can receive such requests, determine that the first content is being presented and the related timing of the presentation, and maintain contextual data associated with the content identifier, account identifier, and/or device identifier.

In an example, the flow 800 may also include operation 812, where the computer system receives, from the computing device at a first time, first data indicating a first request of the second content, the first data including the source information. In an example, the first data indicates that the second content is requested by including the URL of the second content. The presentation identifier can be appended to the URL and, as such, is included in the first data.

In an example, the flow 800 may also include operation 814, where the computer system determines that the first request is associated with the first content based at least in part on the source information included in the first data. In an example, the presentation identifier is determined from the received first data and is used in a query to the data store. The query result includes the content identifier of the first content. When the presentation identifier is additionally associated with the account identifier and/or the device identifier, the query result includes the account identifier and/or the device identifier, as the case may be. In this case, the computer system can also determine the account and/or computing device based on the network address.

In an example, the flow 800 may also include operation 816, where the computer system receives, from the computing device at a second time, second data indicating a second request of the second content, the second data including the source information. In an example, the second data indicates that the second content is requested by including the URL of the second content. The presentation identifier can be appended to the URL and, as such, is included in the second data.

In an example, the flow 800 may also include operation 818, where the computer system determines that the second request is associated with the first content based at least in part on the network address included in the second data. In an example, the presentation identifier is determined from the received second data and is used in a query to the data store. The query result includes the content identifier of the first content. When the presentation identifier is additionally associated with the account identifier and/or the device identifier, the query result includes the account identifier and/or the device identifier, as the case may be. In this case, the computer system can also determine the account and/or computing device based on the network address.

In an example, the flow 800 may also include operation 820, where the computer system stores third data indicating the presentation of the first content on the computing device. In an example, the third data is contextual data that includes the content identifier and is stored in association with the account identifier and/or device identifier. Operations 816-820 can be repeated each time the computing device sends a repeated request for the second content based on the data of the object and the computer system receives data corresponding to the repeated request.

In an example, the flow 800 may also include operation 822, where the computer system receives, at a third time, fourth data indicating a request for a content-related action. In an example, the fourth data is received from the computing device or from another computing device associated with the account. The fourth data can include audio data indicating a natural language utterance detected by the requesting device. As further described in FIG. 10, if the fourth data is received prior to the third data (e.g., contextual data) becoming invalid, the third data can be used to determine the first content. The remaining operation of the flow 800 assumes that this is the case, where the fourth data is received while the third data is valid.

In an example, the flow 800 may also include operation 824, where the computer system determines, based on the third data, that the content-related action is associated with the presentation of the first content. For example, the account identifier associated with the requesting device is used in a query of the third data. The query result includes the content identifier and timing data. The timing data indicates that the first content is currently being presented or was presented within a time interval ago that is shorter than a time threshold (e.g., within the last minute). Accordingly, the computer system determines that the content-related action was requested because of the first content's presentation and, therefore, is associated with the presentation of the first content.

In an example, the flow 800 may also include operation 826, where the computer system causes the content-related action to be performed. Different types of content-related action are possible, such as presenting the first content or related content on the requesting device or causing another system (e.g., a marketplace system) to complete a transaction that includes an item related to the first content. Causing the performing can include sending the relevant content-related action instructions to the requesting device and/or the other system.

Figure 9:
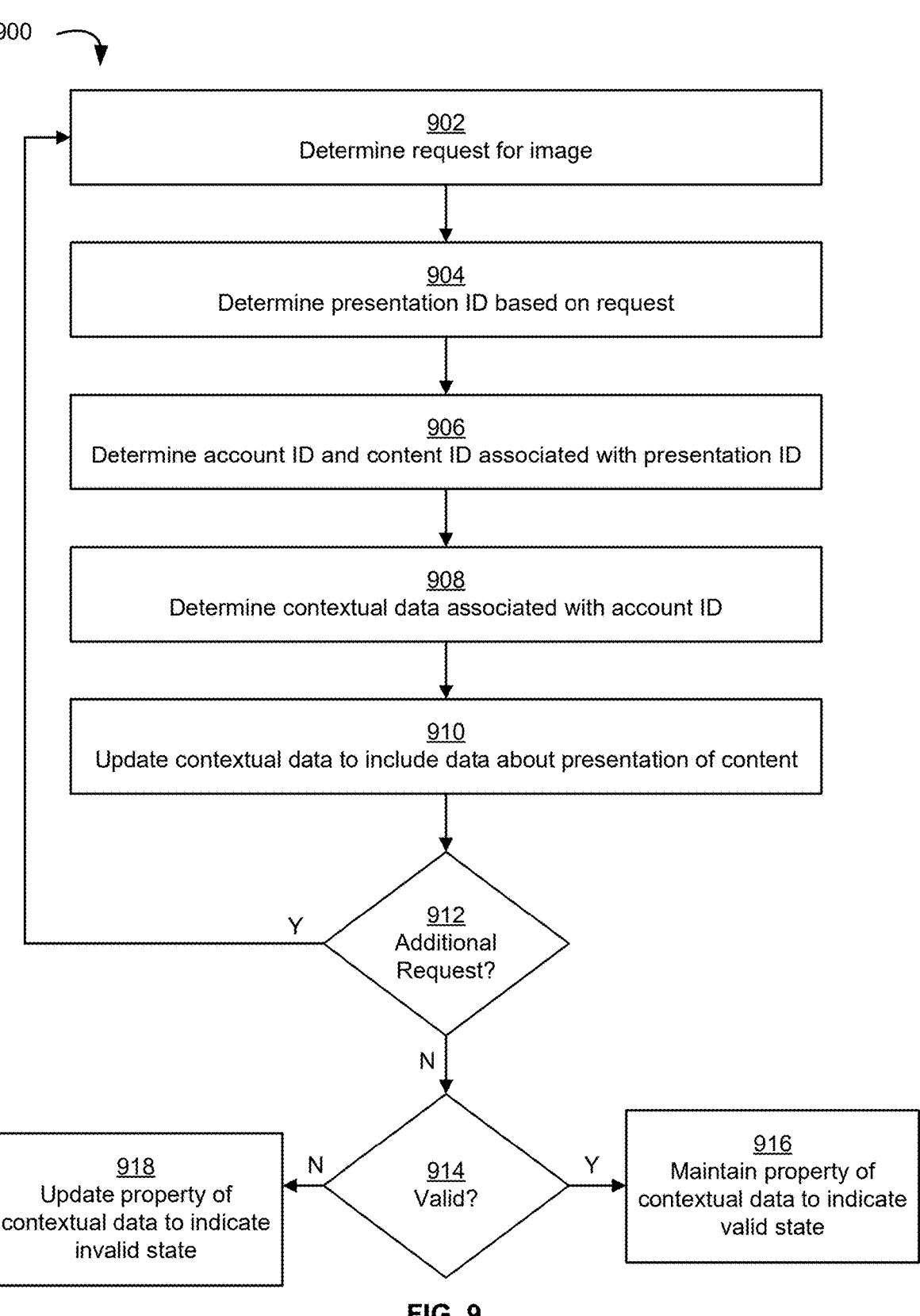
FIG. 9 illustrates an example of a flow for generating and maintaining contextual data based on image requests from a computing device, according to embodiments of the present disclosure.

FIG. 9 illustrates an example of a flow 900 for generating and maintaining contextual data based on image requests from a computing device, according to embodiments of the present disclosure. The contextual data is an example of the contextual data 242 of FIG. 2. The execution of the flow 900 can follow that of the flow 800. The flow 900 is described in connection with an account identifier and a content identifier that are associated with a presentation identifier, and in connection with a 1 pixel×1 pixel image as an example of insertable content. The flow 900 similarly applies to a presentation identifier that may be associated with only the content identifier, with the content identifier and a device identifier, or with the content identifier, the device identifier, and the account identifier. Further, the flow 900 similarly applies to an audio file as an example of insertable content.

As illustrated, the flow 900 may start at operation 902, where the computer system determines a request for an image. The image is a 1 pixel×1 pixel image and is an example of the second content described in the flow 800 herein above. In an example, the computer system receives data from the computing device indicating the request. The data can be first data that is received at a first time and can include a network address of the image, such the image's URL (or any other type of source information). The network address can include a presentation identifier associated with an account identifier and a content identifier. The network address can also optionally include a time value indicating the time at which the request is made. In the exemplary case of a URL, the presentation identifier and, optionally, the time value are appended to the URL.

In an example, the flow 900 may also include operation 904, where the computer system determines the presentation identifier based on the request. In an example, the data (or, more specifically, the network address) is parsed to extract the presentation identifier. If the time value is also included, the computer system can similarly extract it.

In an example, the flow 900 may also include operation 906, where the computer system determines the account identifier and the content identifier associated with the presentation identifier. As explained herein above, a data store stores these identifiers and the association therebetween. In an example, a query is made to the data store, where the query includes the presentation identifier. In response, the computer system receives a query result that includes the account identifier and the content identifier.

In an example, the flow 900 may also include operation 908, where the computer system determines contextual data associated with the account identifier. In an example, contextual data has already been generated and is stored in the same or a different data store. In this example, the contextual data is associated in that data store with the account identifier. Accordingly, a query can be made using the account identifier to determine the contextual data. In another example, no contextual data has been generated yet. In this case, the query result would be null. And the computer system can generate new contextual data (in lieu of updating the contextual data as described in the next operation).

In an example, the flow 900 may also include operation 910, where the computer system updates the contextual data (or generates the contextual data, as the case may be) to include data about the presentation of the content. In an example, the contextual data indicates that the content is presented and a timing of the presentation. For instance, the contextual data includes the content identifier and timestamps. Each timestamp can correspond to a time of when the corresponding request is made. Accordingly, if the contextual data already exists, the computer system may store the timestamp corresponding to the determined request at operation 902. Otherwise, the computer system can also store the content identifier. Other types of information can be indicated by the contextual data, such as a device identifier of the device.

In an example, the flow 900 may also include operation 912, where the computer system determines whether an additional request is made for the image. This determination can be based, for instance, upon receiving, at a periodic or non-periodic rate, data indicating the network address of the image. If no such data is received, the flow 900 can proceed to operation 914. Otherwise, the flow 900 can loop back to operation 902 to process the next received data and accordingly update the contextual data. In this case, at each time period, the contextual data is updated, such that the contextual data can include first data, second data, third, data, fourth data, and so on, corresponding to a first time, a second time, a third time, a fourth time, and so on. Each of these individual data portions of the contextual data includes the content identifier and the corresponding timestamp. Alternatively, the content identifier is stored once and each of these individual data portions of the contextual data includes the corresponding timestamp.

In an example, the flow 900 may also include operation 914, where the computer system determines whether the stored contextual data is valid (e.g., is associated with a valid state). In an example, the validity can be time-based. In this example, the contextual data is invalid (e.g., is associated with an invalid state) if it has timed out. Otherwise, the stored contextual data is associated with a valid state and can be used to support a content-related action. In an example, the computer system maintains a state of the contextual data (e.g., a timeout property of cache entries that store the contextual data). The computer system can determine a time difference between the time when a content-related action is requested (which can correspond to the time of when audio data is received from the computing device and indicates a natural language utterance requesting this action) and the last time the contextual data was updated (which can correspond to the last timestamp of the first content's presentation). The computer system can also determine that the contextual data is associated with a valid state by at least determining that the time difference is less than a predefined time duration. This determination can allow the querying of the cache whereby the cache is queried based on the valid state. As such, the contextual data's state is set to invalid when the last data requesting the image was received some period of time ago and no new data requesting the image has been received since. Otherwise, the state is set to valid. The period of time can be defined to be longer than the periodic time interval at which the image requests can be made (e.g., the frequency for the repeated requests indicated by the requesting data of the object). In other example, the validity need not be time-based. For instance, the content is advertisement that is presented based on an advertisement campaign. The contextual data can remain valid while the advertisement campaign is active. Once the advertisement campaign is terminated, the contextual data can become invalid. In this illustration, the trigger to determine the validity is the status of the advertisement campaign. If the contextual data is valid, the flow 900 can proceed to operation 916. Otherwise, the flow 900 can proceed to operation 918.

In an example, the flow 900 may also include operation 916, where the computer system updates a property of the contextual data to indicate the valid state. For example, a state flag is set to true. In an illustration, the cache time out property is updated by including a flag set to true. Because the state is valid, the contextual data may not be removed and can be used in support of a content-related action.

In an example, the flow 900 may also include operation 918, where the computer system maintains the property of the contextual data to indicate the invalid state. For example, the state flag is set to false. In an illustration, the cache time out property is maintained by setting the flag set to false. Because the state is invalid, the contextual data can remain stored for a period of time before being removed.

Figure 10:
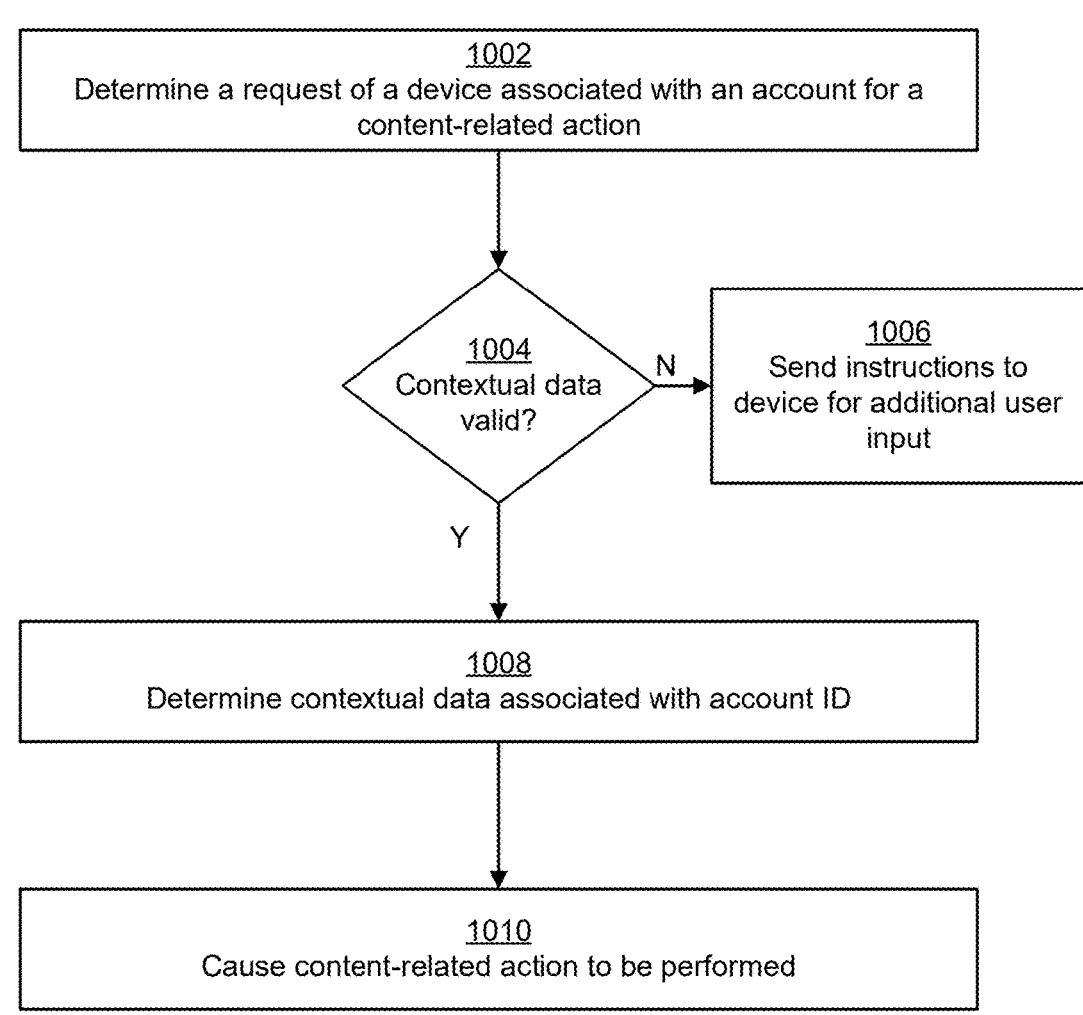
FIG. 10 illustrates an example of a flow for providing a content-related action based on contextual data and in response to a request from a computing device, according to embodiments of the present disclosure.

FIG. 10 illustrates an example of a flow 1000 for providing a content-related action based on contextual data and in response to a request from a computing device, according to embodiments of the present disclosure. The execution of the flow 1000 can follow or be in parallel to that of the flow 900. The flow 1000 is described in connection with an account identifier and a content identifier that are associated with a presentation identifier, and in connection with a 1 pixel×1 pixel image. The flow 1000 similarly applies to a presentation identifier that may be associated with only the content identifier, with the content identifier and a device identifier, or with the content identifier, the device identifier, and the account identifier. Further, the flow 1000 similarly applies to an audio file as an example of insertable content.

As illustrated, the flow 1000 may start at operation 1002, where the computer system determines a request of a computing device associated with an account for a content-related action. The computing device may be the same or a different computing device described in connection with the flows 800 and 900. If different, the two computing devices are associated with the same account. In an example, the computing system receives, from the computing device, data requesting the content-related action. Generally, the data can indicate the content-related action but need not identify the specific content associated with this action. The data can be audio data that represents a natural language utterance detected by a voice user interface of the computing device. In this case, the computer system can process the audio data via a speech processor and an entity resolution component. In another illustration, the data can be structured data received via a graphical user interface of the computing device. Here, at least no speech processing is needed. In both examples, because the data does not identify the content, the computer system may query the data store storing the contextual data.

In an example, the flow 1000 may include operation 1004, where the computer system determines whether the contextual data is valid. For example, the data store stores the contextual data in association with the account identifier. The data store also stores a state of the contextual data. The computer system can query the data store about the state, where the query includes the account identifier. If the query result indicates that the state is valid, the flow 1000 can proceed to operation 1008. Otherwise, the flow 1000 can proceed to operation 1006.

In an example, the flow 1000 may also include operation 1006, where the computer system sends instructions to the computing device for additional user input. In an example, if the data received at operation 1002 is audio data, the computing system can send a text-to-speech message and instructions for presenting this message via the voice user interface. If the data received at operation 1002 is structured data, the computing system can send a message for presenting this message via the graphical user interface. In both cases, the presented message requests the additional user input to identify the content or the related item identified in the content (e.g., the specific movie title advertised in the content).

In an example, the flow 1000 may also include operation 1008, where the computer system determines the contextual data associated with the account identifier. In an example, the computer system sends a query to the data store requesting the contextual data. The query can include the account identifier. The query result can return the contextual data or one or more portions thereof, such as the content identifier and the timing data.

In an example, the flow 1000 may also include operation 1010, where the computer system causes the content-related action to be performed based on the contextual data. In an example, the content-related action is performed on the content (e.g., the content is a movie that is presented on the computing device) and/or the related item (e.g., the content is an advertisement for a movie, and the movie's trailer is presented on the computing device, or the movie is purchased). Depending on the specific content-related action and the computing device and/or system to perform the content-related action, as described in FIGS. 4-7, the computer system can send content-related actions to the computing device and/or system.

Figure 11:
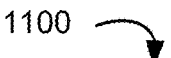
FIG. 11 illustrates an example of a flow for selecting contextual data in support of a content-related action, according to embodiments of the present disclosure.

FIG. 11 illustrates an example of a flow 1100 for selecting contextual data in support of a content-related action, according to embodiments of the present disclosure. The execution of the flow 1100 can be in parallel to that of the flow 1000. For example, operations 1104-1110 of the flow 1100 can be performed between operations 1002 and 1004 of the flow 1000. Generally, an account can be associated with multiple devices. Different content can be presented on the devices and these presentations result in different contextual data. For instance, the account is associated with a first device and a second device. A first advertisement is presented on the first device, resulting in the storing of first contextual data indicating the presentation of the first advertisement. Similarly, a second advertisement is presented on the second device, resulting in the storing of second contextual data indicating the presentation of the first advertisement. In another illustration, a device can present different content over time or in parallel and these presentations result in different contextual data. For instance, the device presents, at a GUI, a first advertisement and a second advertisement at a first time and a second time, respectively. Or the device presents, at different presentation placements (e.g., tiles) of the GUI, the first advertisement and the second advertisement at the same time. In both cases, the presentation of the first advertisement results in first contextual data and the presentation of the second advertisement results in second contextual data. In both illustrations, when a request for a content-related action is determined, one of the contextual data (e.g., the first contextual data or the second contextual data) needs to be selected.

As illustrated, the flow 1100 may start at operation 1102, where the computer system determines a request of a computing device associated with an account for a content-related action. This operation is similar to operation 1002 of the flow 1000. The request can be received in data sent from the computing device, where the data can also indicate a device identifier of the device and/or an account identifier associated with the computing device.

In an example, the flow 1100 may include operation 1104, where the computer system determines a set of contextual data associated with the account. For example, the computer system determines one or both of the device identifier or the account identifier from the data that requested the content-related action. The device identifier and/or the account identifier can be used to query a data store storing different contextual data. The query result includes the set of contextual data, where this set includes first contextual data corresponding to a presentation of first content, second contextual data corresponding to a presentation of second content, and so on and so forth. Each presentation can be performed by the computing device or by another computing device associated with the account.

In an example, the flow 1100 may include operation 1106, where the computer system determines whether any contextual data of the set of contextual data is selectable. In an example, the determination can be across one or more dimensions. A first dimension is a time dimension. In particular, recency per contextual data can be considered. The contextual data (e.g., the first contextual data) that was most recently generated, most recently updated, and/or indicates the most recent content presentation can be selected. A second dimension is a device dimension. For instance, each contextual data can be associated with a device identifier. Because the computer system has determined that the request for the content-related action is associated with the device identifier of the computing device, this device identifier can be used in the querying, such that the query result can return the contextual data (e.g., the first contextual data) that is associated with the computing device. In other words, if the first contextual data was generated because of content presentation by the computing device, whereas second contextual data was generated because of content presentation by another computing device, the first contextual data is selected since the request for the content-related action is received from the computing device. Another parameter that can be used in the device dimension is the requesting application. In particular, the computer system can determine a particular application that is executing on the computing device and that caused the request for the content-related action. In this illustration, and as described herein above, contextual data generated because of the content presentation by the application can be associated with the application. As such, the query can indicate the application to determine the particular contextual data associated with the application. In both illustrations, if the query result includes multiple contextual data associated with the computing device and/or the application (e.g., the first contextual data, third contextual data, etc.), the recency of the contextual data can be used to select one of them.

In an example, the flow 1100 may include operation 1108, where the computer system sends instructions to the computing device for additional user input. This operation is similar to operation 1006 of the flow 1000 and is performed because of the incapability to select one of the contextual data.

In an example, the flow 1100 may include operation 1110, where the computer system selects one of the contextual data from the set of contextual data (e.g., the first contextual data as the case may be). Upon this selection, the computer system can proceed with using the selected contextual data to determine that the content indicated by the selected contextual data and that the content-related action is associated with the presentation of this content.

Figure 12:
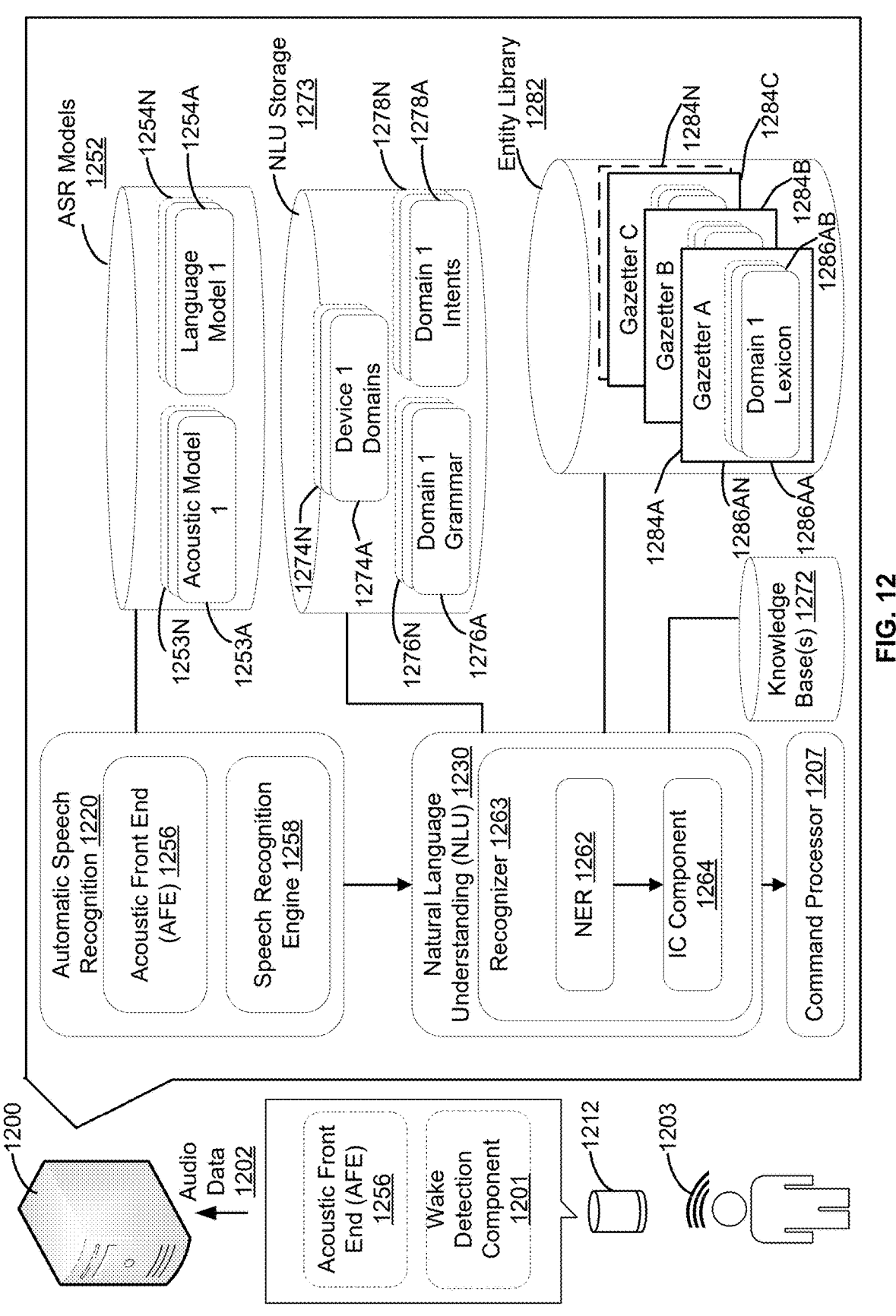
FIG. 12 illustrates a conceptual diagram of how a spoken utterance can be processed, allowing a system to capture and execute commands spoken by a user, according to embodiments of the present disclosure.

FIG. 12 illustrates a conceptual diagram of how a spoken utterance can be processed, allowing a system to capture and execute commands spoken by a user, such as spoken commands that may follow a wakeword, or trigger expression (e.g., a predefined word or phrase for "waking" a device, causing the device to begin sending audio data to a remote system). The various components illustrated may be located on a same or different physical devices.

Communication between various components illustrated in FIG. 12 may occur directly or across a network. An audio capture component, such as a microphone of a device 1210, captures audio 1203 corresponding to a spoken utterance. The device 1210, using a wakeword detection component 1201, then processes audio data corresponding to the audio 1203 to determine if a keyword (such as a wakeword) is detected in the audio data. Following detection of a wakeword, the device 1210 sends audio data 1202 corresponding to the utterance to a computer system 1200 that includes an ASR component 1220. The ASR component 1220 can be similar to the ASR component 332, 432, 532, or 632 of the speech processor 330, 430, 530, or 630.

The audio data 1202 may be output from an optional acoustic front end (AFE) 1256 located on the device prior to transmission. In other instances, the audio data 1202 may be in a different form for processing by a remote AFE 1256, such as the AFE 1256 located with the ASR component 1220 of the computer system 1200.

The wakeword detection component 1201 works in conjunction with other components of the user device, for example a microphone to detect keywords in audio 1203. For example, the device may convert audio 1203 into audio data, and process the audio data with the wakeword detection component 1201 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection component 1201 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 1201 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 1210 may "wake" and begin transmitting audio data 1202 corresponding to input audio 1203 to the computer system 1200 for speech processing. Audio data corresponding to that audio may be sent to the computer system 1200 for routing to a recipient device or may be sent to the computer system 1200 for speech processing for interpretation of the included speech (either for purposes of enabling voice-communications and/or for purposes of executing a command in the speech). The audio data 1202 may include data corresponding to the wakeword, or the portion of the audio data corresponding to the wake-word may be removed by the local device 1210 prior to sending. Further, a local device may "wake" upon detection of speech/spoken audio above a threshold, as described herein. Upon receipt by the remote computer system 1200, an ASR component 1220 may convert the audio data 1202 into text. The ASR transcribes audio data into text data representing the words of the speech contained in the audio data 1202. The text data may then be used by other components for various purposes, such as executing system commands, inputting data, etc. A spoken utterance in the audio data is input to a processor configured to perform ASR which then interprets the utterance based on the similarity between the utterance and pre-established language models 1254 stored in an ASR model knowledge base (ASR Models Storage 1252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (e.g., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1253 stored in an ASR Models Storage 1252), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1220 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1256 and a speech recognition engine 1258. The acoustic front end (AFE) 1256 transforms the audio data from the microphone into data for processing by the speech recognition engine 1258. The speech recognition engine 1258 compares the speech recognition data with acoustic models 1253, language models 1254, and other data models and information for recognizing the speech conveyed in the audio data. The AFE 1256 may reduce noise in the audio data and divide the digitized audio data into frames representing time intervals for which the AFE 1256 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1256) and transmit that information to a server across a network for ASR processing. Feature vectors may arrive at the remote computer system 1200 encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, add the music to the kitchen," or "Alexa, move the music to the kitchen," or "Alexa, stop the music in the kitchen." The wake detection component may identify the wake word, otherwise described as a trigger expression, "Alexa" in the user utterance and may "wake" based on identifying the wake word. Audio data corresponding to the user utterance may be sent to the remote computer system 1200 where the speech recognition engine 1258 may identify, determine, and/or generate text data corresponding to the user utterance, here "add the music to the kitchen," "move the music to the kitchen," or "stop the music in the kitchen." The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1258 to other processing components, which may be local to the device performing ASR and/or distributed across the network(s). For example, ASR results in the form of a single textual representation of the speech, an N-best list including multiple hypotheses and respective scores, lattice, etc. may be sent to the remote computer system 1200, for natural language understanding (NLU) processing, such as conversion of the text into commands for execution, either by the user device, by the remote computer system 1200, or by another device (such as a server running a specific application like a search engine, etc.).

The device performing NLU processing may include various components, including potentially dedicated processor(s), memory, storage, etc. As shown in FIG. 12, an NLU component 1230 may include a recognizer 1263 that includes a named entity recognition (NER) component 1262 which is used to identify portions of query text that correspond to a named entity that may be recognizable by the system. The NLU component 1230 can be similar to the NLU component 334, 434, 534, or 634 of the speech processor 330, 430, 530, or 630. The NER component can be similar to the entity resolution component 340, 440, 540, or 640. A downstream process called named entity resolution links a text portion to a specific entity known to the system. To perform named entity resolution, the system may utilize gazetteer information (1284a-1284n) stored in entity library storage 1282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1220 based on the utterance input audio 1203) and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device (e.g., device 1210) to complete that action. For example, if a spoken utterance is processed using ASR and outputs the text "add music to the kitchen" the NLU process may determine that the user intended for the audio being output by a device also be output by another device associated with the identifier of kitchen.

The NLU may process several textual inputs related to the same utterance. For example, if the ASR outputs N text segments (as part of an N-best list), the NLU may process all N outputs to obtain NLU results.

As will be discussed further below, the NLU process may be configured to parse and tag to annotate text as part of NLU processing. For example, for the text "move the music to the kitchen," "move" may be tagged as a command (to output audio on a device) and "kitchen" may be tagged as a specific device to output the audio on instead of the previous device.

To correctly perform NLU processing of speech input, an NLU process may be configured to determine a "domain" of the utterance so as to determine and narrow down which services offered by the endpoint device (e.g., remote computer system 1200 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1262 receives a query in the form of ASR results and attempts to identify relevant grammars and lexical information that may be used to construe meaning. To do so, the NLU component may begin by identifying potential domains that may relate to the received query. The NLU storage 1273 includes a database of devices (1274a-1274n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1263, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1286aa to 1286an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result. An intent classification (IC) component 1264 parses the query to determine an intent or intents for each identified domain, where the intent corresponds to the action to be performed that is responsive to the query. Each domain is associated with a database (1278a-1278n) of words linked to intents. For example, a music intent database may link words and phrases such as "add," "move," "remove," "quiet," "volume off;" and "mute" to a "mute" intent. A voice-message intent database, meanwhile, may link words and phrases such as "send a message," "send a voice message," "send the following," or the like. The IC component 1264 identifies potential intents for each identified domain by comparing words in the query to the words and phrases in the intents database 1278. In some instances, the determination of an intent by the IC component 1264 is performed using a set of rules or templates that are processed against the incoming text to identify a matching intent.

In order to generate a particular interpreted response, the NER 1262 applies the grammar models and lexical information associated with the respective domain to actually recognize a mention of one or more entities in the text of the query. In this manner, the NER 1262 identifies "slots" or values (e.g., particular words in query text) that may be needed for later command processing. Depending on the complexity of the NER 1262, it may also label each slot with a type of varying levels of specificity (such as noun, place, city, artist name, song name, device identification, audio identification, audio-session queue identification, or the like). Each grammar model 1276 includes the names of entities (e.g., nouns) commonly found in speech about the particular domain (e.g., generic terms), whereas the lexical information 1286 from the gazetteer 1284 is personalized to the user(s) and/or the device. For instance, a grammar model associated with the shopping domain may include a database of words commonly used when people discuss shopping. In case an entity is not identified for a slot, the NER 1262 can query contextual data, such as contextual data 142 to identify the value.

The intents identified by the IC component 1264 are linked to domain-specific grammar frameworks (included in 1276) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "add the music to the kitchen" is an identified intent, a grammar (1076) framework or frameworks may correspond to sentence structures such as "add {audio-session queue} to {kitchen}."

For example, the NER component 1262 may parse the query to identify words as subject, object, verb, preposition, etc., based on grammar rules and/or models, prior to recognizing named entities. The identified verb may be used by the IC component 1264 to identify intent, which is then used by the NER component 1262 to identify frameworks. A framework for the intent of "play a song," meanwhile, may specify a list of slots/fields applicable to play the identified "song" and any object modifier (e.g., specifying a music collection from which the song should be accessed) or the like. The NER component 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1262 may search the database of generic words associated with the domain (in the knowledge base 1272). So, for instance, if the query was "add the music to the kitchen," after failing to determine which device corresponds to the identify of "kitchen," the NER component 1262 may search the domain vocabulary for device identifiers associated with the word "kitchen." In the alternative, generic words may be checked before the gazetteer information, or both may be tried, potentially producing two different results.

The output data from the NLU processing (which may include tagged text, commands, etc.) may then be sent to a command processor 1207. The destination command processor 1207 may be determined based on the NLU output. For example, if the NLU output includes a command to send a message, the destination command processor 1207 may be a message sending application, such as one located on the user device or in a message sending appliance, configured to execute a message sending command. If the NLU output includes a search request, the destination command processor 1207 may include a search engine processor, such as one located on a search server, configured to execute a search command. After the appropriate command is generated based on the intent of the user, the command processor 1207 may provide some or all of this information to a text-to-speech (TTS) engine. The TTS engine may then generate an actual audio file for outputting the audio data determined by the command processor 1207 (e.g., "playing in the kitchen," or "music moved to the kitchen"). After generating the file (or "audio data"), the TTS engine may provide this data back to the remote computer system 1200.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component during runtime operations where NLU operations are performed on text (such as text output from an ASR component). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1263. Each recognizer may include various NLU components such as an NER component 1262, IC component 1264 and other components such as an entity resolver, or other components. For example, a messaging domain recognizer 1263-A (Domain A) may have an NER component 1262-A that identifies what slots (e.g., portions of input text) may correspond to particular words relevant to that domain. The words may correspond to entities such as (for the messaging domain) a recipient. An NER component 1262 may use a machine learning model, such as a domain specific conditional random field (CRF) to both identify the portions corresponding to an entity as well as identify what type of entity corresponds to the text portion. The messaging domain recognizer 1263-A may also have its own intent classification (IC) component 1264-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote computer system 1200, as illustrated herein are exemplary, and may be located in a stand-alone device or may be included, in whole or in part, as a component of a larger device or system, may be distributed across a network or multiple devices connected by a network, etc.

Figure 13:
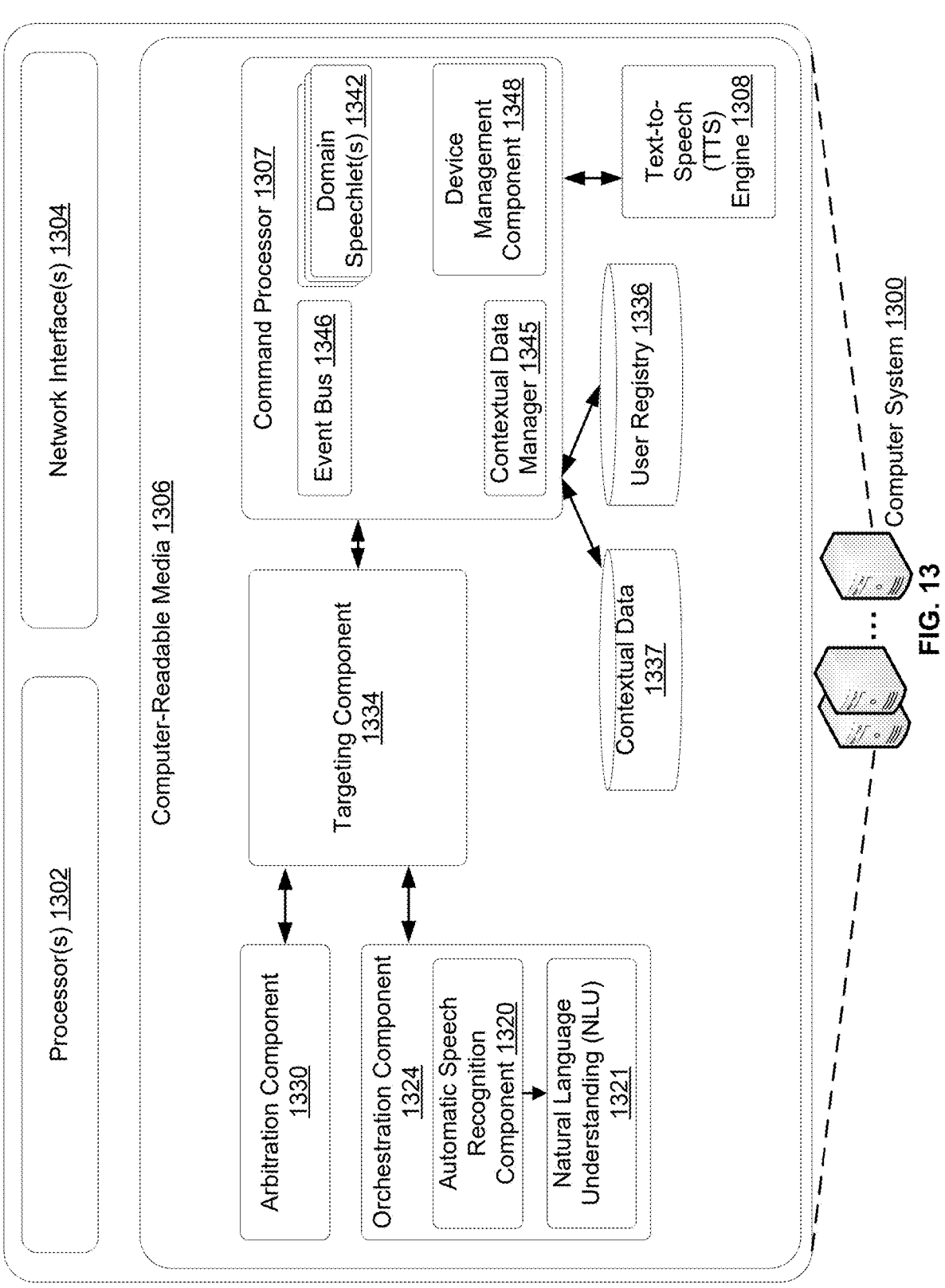
FIG. 13 illustrates a conceptual diagram of components of a computer system associating audio output commands with multiple devices, according to embodiments of the present disclosure.

FIG. 13 illustrates a conceptual diagram of components of a computer system 1300 associating audio output commands with multiple devices, including a command processor 1307 configured to generate a command that the selected voice-enabled device uses to respond to a user utterance. As used with respect to FIG. 13, a voice-enabled device may include a device, such as any of the devices described herein above. As illustrated in FIG. 13, the computer system 1300, including the orchestration component 1324 and a speech processing component comprising an ASR component 1320 and an NLU component 1321, may be coupled to a targeting component 1334 and provide the targeting component 1334 with the intent determined to be expressed in the user utterance. Further, the arbitration component 1330 may provide the ranked list of devices to the targeting component 1334, as well as device indicators (e.g., IP addresses, devices names, etc.) for one or more of the voice-enabled devices in the ranked list of devices. The targeting component 1334 may then perform techniques to determine a target device (e.g., a device to perform the requested operation), and provide various data to the command processor 1307. For instance, the targeting component 1334 may provide the command processor 1307 with various device identifiers of the voice-enabled devices, the determined target device, the determined intent and/or command, etc. By way of example, the targeting component 1334 may determine which devices to add to a grouping of device, which devices to remove from a grouping of devices, and/or which devices to move an audio-session to.

The command processor 1307 and/or NLU component 1321 may determine a domain based on the intent and, based on this determination, route the request corresponding to the audio data to the appropriate domain speechlet, such as the illustrated domain speechlets 1342. The domain speechlet 1342 may comprise any type of device or group of devices (e.g., hardware device, virtual devices or partitions, server, etc.), and may receive the text data and/or an intent associated with the audio signals and may determine how to respond to the request. For instance, the intent for a command "add the music to the kitchen" may be routed to a music domain speechlet 1342, which controls devices, such as speakers, connected to the voice-enabled devices. The music domain speechlet 1342 may determine a command to generate based on the intent of the user to output audio on a device associated with the kitchen identifier as when as continuing to output the audio on another device that is currently outputting the audio. Additionally, the music domain speechlet 1342 may determine additional content, such as audio data, to be output by one of the voice-enabled devices, such as "kitchen has been added to your audio session."

Various types of domain speechlets 1342 may be used to determine which devices to send commands to and/or to use in response to a user utterance, as well as the appropriate response and potential additional content (e.g., audio data). For example, the domain speechlets 1342 may include a third party skills domain speechlet 1342, which may handle intents associated with gaming, productivity, etc., a music domain speechlet 1342, which may handle intents associated with music play requests, and/or an information domain speechlet 1342, which may handle requests for information associated, for example, with the status of a particular device and/or content being utilized and/or output by a particular device and/or group of devices.

After the domain speechlet 1342 generates the appropriate command, which may be described herein as directive data, based on the intent of the user, and/or provides additional content, such as audio data, to be output by one of the voice-enabled devices, the domain speechlet 1342 may provide this information back to the computer system 1300, which in turns provides some or all of this information to a text-to-speech (TTS) engine 1308. The TTS engine 1308 then generates an actual audio file for outputting the second audio data determined by the domain speechlet 1342. After generating the file (or "audio data"), the TTS engine 1308 may provide this data back to the computer system 1300.

The computer system 1300 may then publish (e.g., write) some or all of this information to an event bus 1346. That is, the computer system 1300 may provide information regarding the initial request (e.g., the speech, the text, the domain/intent, etc.), the response to be provided to the voice-enabled device, or any other information pertinent to the interaction between the voice-enabled device and the computer system 1300 to the event bus 1346.

Within the computer system 1300, one or more components or services, including a contextual data manager 1345, may subscribe to the event bus 1346 so as to receive information regarding interactions between user devices and the computer system 1300. The contextual data manager 1345 can be responsible for maintaining contextual data 1337 in a data store. In the illustrated example, for instance, the device management component 1348 may subscribe to the event bus 1346 and, thus, may monitor information regarding these interactions. In some examples, monitoring information in the event bus 1346 may comprise communications between various components of the computer system 1300. For example, the targeting component 1334 may monitor the event bus 1346 to identify device state data for voice-enabled devices. In some examples, the event bus 1346 may "push" or send indications of events and/or device state data to the targeting component 1334. Additionally, or alternatively, the event bus 1346 may be "pulled" where the targeting component 1334 sends requests to the event bus 1346 to provide an indication of device state data for a voice-enabled device. The event bus 1346 may store indications of the device states for the devices, such as in a database (e.g., user registry 1336), and using the stored indications of the device states, send the device state data for voice-enabled devices to the targeting component 1334. Thus, to identify device state data for a device, the targeting component 1334 may send a request to the event bus 1346 (e.g., event component) to provide an indication of the device state data associated with a device, and receive, from the event bus 1346, the device state data that was requested.

The device management component 1348 functions to monitor information published to the event bus 1346 and identify events that may trigger action. For instance, the device management component 1348 may identify (e.g., via filtering) those events that: (i) come from voice-enabled devices that are associated with secondary device(s) (e.g., have secondary devices in their environments such as televisions, personal computing devices, etc.), and (ii) are associated with supplemental content (e.g., image data, video data, etc.). The device management component 1348 may reference the user registry 1336 to determine which voice-enabled devices are associated with secondary devices, as well as determine device types, states, and other capabilities of these secondary devices. For instance, the device management component 1348 may determine, from the information published to the event bus 1346, an identifier associated with the voice-enabled device making the corresponding request or the voice-enabled device selected to respond to or act upon the user utterance. The device management component 1348 may use this identifier to identify, from the user registry 1336, a user account associated with the voice-enabled device. The device management component 1348 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like. For example, the secondary devices may include speakers that may wirelessly communicate with the voice-enabled device and/or one or more other secondary devices, such as personal devices.

The device management component 1348 may determine whether a particular event identified is associated with supplemental content. That is, the device management component 1348 may write, to a datastore, indications of which types of events and/or which primary content or responses are associated with supplemental content. In some instances, the computer system 1300 may provide access to third-party developers to allow the developers to register supplemental content for output on secondary devices for particular events and/or primary content. For example, if a voice-enabled device is to output that the weather will include thunder and lightning, the device management component 1348 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1348 may store an association between the primary response or content (e.g., outputting of information regarding the world's largest mammal) and corresponding supplemental content (e.g., the audio data, image data, or the like). In some instances, the device management component 1348 may also indicate which types of secondary devices are to output which supplemental content. For instance, in the instant example, the device management component 1348 may store an indication that secondary devices of a class type "tablet" are to output a picture of a blue whale. In these and other instances, meanwhile, the device management component 1348 may store the supplemental content in association with secondary-device capabilities (e.g., devices with speakers output the audio commentary, devices with screens output the image, etc.).

The device management component 1348 may also determine how to transmit response and/or supplement content (and/or information acquiring the content) to the voice-enabled devices and/or the secondary devices. To make this determination, the device management component 1348 may determine a device type of the voice-enabled devices and/or secondary devices, capabilities of the device(s), or the like, potentially as stored in the user registry 1336. In some instances, the device management component 1348 may determine that a particular device is able to communicate directly with the computer system 1300 (e.g., over WiFi) and, thus, the device management component 1348 may provide the response and/or content directly over a network to the secondary device (potentially via the computer system 1300). In another example, the device management component 1348 may determine that a particular secondary device is unable to communicate directly with the computer system 1300, but instead is configured to communicate with a voice-enabled device in its environment over short-range wireless networks. As such, the device management component 1348 may provide the supplement content (or information) to the computer system 1300, which in turn may send this to the voice-enabled device, which may send the information over a short-range network to the secondary device.

The computer-readable media 1306 may further include the user registry 1336 that includes data regarding user profiles as described herein. The user registry 1336 may be located part of, or proximate to, the computer system 1300, or may otherwise be in communication with various components, for example over the network. The user registry 1336 may include a variety of information related to individual users, accounts, etc. that interact with the voice-enabled devices, and the computer system 1300. For illustration, the user registry 1336 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 1336 may store indications of associations between various voice-enabled devices and/or secondary device, such as virtual clusters of devices, states of devices, and associations between devices and audio-session queues. The user registry 1336 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 1307 and/or the domain speechlets 1342 may determine, based on the stored device states in the user registry 1336, a current device state of the voice-enabled devices. Rather than receiving device states for the voice-enabled devices, in metadata, the device states may already have been determined or received and stored in the user registry 1336. Further, the user registry 1336 may provide indications of various permission levels depending on the user. As an example, the computer system 1300 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions. In some examples, to determine the device state, the event bus 1346 may publish different events which indicate device states to various entities or components that subscribe to the event bus 1346. For instance, if an event of "play music" occurs for a voice-enabled device, the event bus 1346 may publish the indication of this event, and thus the device state of outputting audio may be determined for the voice-enabled device. Thus, various components, such as the targeting component 1334, may be provided with indications of the various device states via the event bus 1346. The event bus 1346 may further store and/or update device states for the voice-enabled devices in the user registry 1336. The components of the computer system 1300 may query the user registry 1336 to determine device states. A particular user profile may include a variety of data that may be used by the computer system 1300. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

A speech-controlled computing system may answer user commands requesting the output of content. In various examples, in order to interpret a request, the NLU component of a speech processing system may have access to contextual information. Contextual information or data (e.g., contextual speech-processing data) may be factual information contextualized to a particular entity. An entity may be a particular content ID, a particular device ID, a particular IP address, an account ID, a request ID, etc. For example, a user may speak the request, "Computer, play the trailer?" The speech processing system may have access to contextual information related to the content ID. For example, the speech processing system may access contextual data indicating that the content ID is a particular movie title. In the example, the speech processing system may use this contextual information to determine that the user is requesting to play the trailer of the particular movie title. By contrast, global information may be information that is the same regardless of any particular entity. For example, the speed of light in vacuum is 299,792,458 meters per second. The speed of light in vacuum is an example of global information.

Various different partition keys may be used to define an entity for a shared execution caching architecture. For example, for the user request "Computer, play the trailer?", the NLU component may have access to the content identifier and a device identifier (e.g., an identifier of a speech-processing device with one or more microphones receiving the spoken user request). In this example, the device identifier may be the partition key by which an entity is distinguished from among other entities (e.g., one device ID is distinguishable from among other, different device IDs). The NLU component may receive the contextual data (e.g., the content identifier and the device identifier) along with text representing the spoken request. Accordingly, the contextual data may be used to form an inference that the user would like to play the trailer of the particular movie title on the device.

Additionally, the user (or a different user) may request "Computer, start the movie." In accordance with various embodiments described herein, the device ID of this request may match the device ID of the previous weather request. Accordingly, both requests may be routed to the same contextual data host system (or device). Routing contextual data requests with the same partition key to the same contextual data host system allows the data host system to analyze pending requests for redundancy. When redundancy is detected, the contextual data host system may generate an executable process to retrieve the requested data for one request and may cache the requested data. Thereafter, the contextual data host system may provide the cached data in response to redundant requests without having to generate additional executable processes to retrieve redundant data.

Returning to the previous example, since the play trailer request and start movie are both related to the same device ID (e.g., the partition key defining an entity in the current example), the two requests for contextual data may be sent by an orchestrator of the speech processing system to the same contextual data host system. Thereafter, the contextual data host system may determine that two requests are pending for the same field of a database (e.g., the field that stores content that is being shown on a device having the device ID). Accordingly, the contextual data host may generate an executable instruction to retrieve the data in response to one of the two requests. The contextual data host may thereafter store the retrieved result (e.g., resolution of an entity to the particular movie title) in a cache and may provide the cached result in response to the remaining, pending request without having to generate a second executable instruction to re-retrieve the data from the underlying database. The results may be returned to the speech processing components.

Other examples of partition keys used to define entities (apart from device identifiers) may include request identifier data (e.g., data that identifies a request from among other requests), a content identifier, an account identifier (e.g., data that identifies an account from among other accounts), a user identifier, etc. Contextual data may be used in other ways apart from inference making and/or natural language processing. For example, skills (e.g., speech processing skills) may use contextual information to train machine learning models to make predictions relevant to the skill. Additionally, a list of appropriate skills and/or intents (e.g., semantic understandings of user utterances) may be ranked based at least in part on contextual data.

The system may be configured with multiple applications (e.g., thousands, tens of thousands, or more applications) that can be used to respond to user commands. Applications, domains (a term associated with natural language processing), speechlets, actions (with respect to Google Assistant), and other similar terms are referred to herein as "skills". For example, the system may include weather skills, music skills, video skills, calendar skills, timer skills, general knowledge answering skills, game skills, etc. Further, the system may be capable of operating many different skills that have an overlapping subject matter. For example, the system may include more than one skill that can execute commands related to requests for weather information. For further example, the system may include one or more medical information skills that execute commands requesting medical information. Determining which skill or skills may be applicable to handle an incoming user command is a non-trivial determination. Contextual data may be used to determine the appropriate skill or skills to invoke based on a particular user utterance.

The invocation of a skill by a user's utterance may include a request that an action be taken. That request can be transmitted to a control system that will cause that action to be executed. For example, the user's utterance may be, "Computer, turn on the living room lights." In response, instructions may be sent to a "smart home" system to turn on the lights in the user's living room. Examples of skills include voice-enabled applications invoked by the Siri virtual personal assistant from Apple Inc. of Cupertino, Calif., voice-enabled actions invoked by the Google Assistant virtual personal assistant from Google LLC of Mountain View, Calif., or voice-enabled skills invoked by the Alexa virtual personal assistant from Amazon.com, Inc. of Seattle, Wash.

In various examples, statistical NLU may be used to reduce the cognitive burden on the user. In an NLU-based approach, user utterances are typically classified into one or more intents (e.g., intent data) and/or to one or more supported skills (or into an unsupported skill) followed by further skill-dependent intent and slot analyses (e.g., intent classification and entity extraction). In various examples, statistical NLU may be used to determine a list of intents, domains, skills, etc., that the user may have intended to invoke. The list of intents, domains, skills, etc. may be selected based at least in part on contextual data provided to the NLU. In some examples, the list of intents and/or domains (and/or other NLU results) may be ranked using a ranker component. Intents may be passed to an appropriate skill to perform an action in response to the request. In the example above where the user asks "Computer, what is the weather?" The intent may be a get_weather intent. The get_weather intent may be passed to a weather skill configured to provide audio of the current day's weather forecast. In various examples, contextual data may be used by the NLU to determine the intent based upon input textual data and/or by the skill to determine the appropriate action to take in response to the intent. For example, the location registered in association with the device ID (e.g., Seattle, Wash.) may be provided by the NLU such that the intent generated by the NLU is a get_weather intent for the location "Seattle". The location registered in association with the device ID is an example of first contextual data. Similarly, the weather skill may determine, based on a previous request issued by the device ID or by an IP address associated with the device ID, that the user typically desires the forecast for the subsequent calendar day, based on previous interactions (e.g., previous turns of dialog) with the same device ID. The knowledge that weather requests issuing from the device ID typically request the forecast for the subsequent calendar day may be an example of second contextual data used by the weather skill to provide the best possible output for the user.

In addition to various speech processing components using contextual data, various speech processing components may generate contextual data. For example, a user may utter a spoken request that a particular song be added to a playlist. A music skill may add the song to the playlist. In various examples, an identifier for the song added to the playlist (e.g., a song name and/or album name) may represent contextual data (e.g., in the form of a content identifier) for the device ID, account ID, request ID, IP address, or other entity.

In various examples described herein, contextual data may be stored at a variety of network-accessible locations for retrieval by skills, applications, NLU components, ranker components, and/or other components of the speech-processing architectures. A context system access layer may provide a single access point to contextual data stored by a plurality of contextual data system hosts (sometimes referred to herein as "hosts" or "host devices"). The plurality of context data system hosts (e.g., hosts) together with the context system access layer may be referred to herein as a "context aggregator system". Dedicated hosts and/or dedicated storage within hosts or accessible by hosts may be provided for various types of contextual data. In various examples, a context system access layer may include one or more pending request agents that may comprise lists of pending requests partitioned based on the relevant partition key for a particular entity. Pending request agents may be specific to a single contextual host system or group of contextual host systems. For example, a pending request agent may comprise a list of all pending requests for a particular request ID, device ID, or some other entity, that are directed to a particular contextual data host. Examples of pending requests may include queries (e.g., GraphQL queries) used to retrieve contextual data from one or more of the underlying contextual data systems and/or requests to modify database entries associated with the relevant entity. The context aggregator system may further comprise one or more query execution engines. Query execution engines may be effective to create and execute processes (e.g., queries and/or other operations) based on requests received from various speech processing components (e.g., a natural language components, a skill, etc.). In various examples, query execution engines may be specific to a contextual data host or group of contextual data hosts. The processes created by the query execution engines may be executed to retrieve and/or modify data from the underlying contextual data systems. In various examples described herein, a query execution engine may parse lists of requests associated with a pending request agent for a particular entity to determine whether or not any redundant or partially redundant operations are present. If redundant operations are present, the query execution engine may execute a single process (e.g., a single executable instruction) to retrieve the requested data and may cache the data for the other redundant processes. In this way, the context aggregator system can avoid generating multiple executable processes to retrieve the same data. Such an architecture may reduce computational load and latency. Requests with redundant operations may be referred to as "redundant requests". Additionally, requests with a first number of redundant operations and a second number of non-redundant operations may be referred to as "partially-redundant requests", while requests with the same set of operations may be referred to as "redundant requests".

For example, a pending request agent may comprise a list of currently-pending requests for a particular request ID "1234". The list may include a first request to query fields A, B, C, and D. The list may include a second request to query fields B, C, and E. A query execution engine may parse the list of currently-pending requests for request ID 1234 and may determine that the first request and second request are partially redundant insofar as both the first request and second request are requesting the retrieval of values stored in fields B and C. Accordingly, in an example, the query execution engine may generate an executable instruction to process the first request (e.g., an executable operation to query fields A, B, C, and D). After completion of the first request, the query execution engine may store the values of B and C in a cache. As the values of fields B and C have already been returned and cached based on the first request, the values of fields B and C may be provided in response to the second request instead of generating a new executable instruction to retrieve the values from fields B and C.

Further, a particular partition key may be used to direct all queries related to the same entity to the same host and/or set of hosts. As such, pending request agent lists for a particular entity may be associated with a particular context system host. Query execution engines may direct all executable processes to the relevant host based on the partition key (e.g., based on the entity to which the process is directed). Since all processes related to a particular entity are processed on the same host, redundancy in the processes can be exploited by caching execution results and delaying processes directed to returning redundant results until such results have been cached by an earlier-completed process.

In some examples, query execution engines may comprise prefetching logic programmed to determine particular database fields to prefetch based on current and/or previous processes (e.g., queries). Probability thresholds may be used to determine whether or not to prefetch a particular field. For example, a query execution engine may determine from historical data that a query directed to return the value of field A is followed by a query to return the value of field B, within a predetermined amount of time (e.g., 5 milliseconds, 14 second, 2 seconds, or any suitable amount of time) in 91% of the previous 1,000 cases. In the example, the query execution engine may prefetch any field that has a probability of greater than or equal to 85% of being queried/requested given that a previous field has been queried/requested. Such a probability threshold may be referred to as a prefetch probability threshold. Accordingly, in the example, the query execution engine may prefetch field B prior to receiving a query request to fetch field B.

Figure 14:
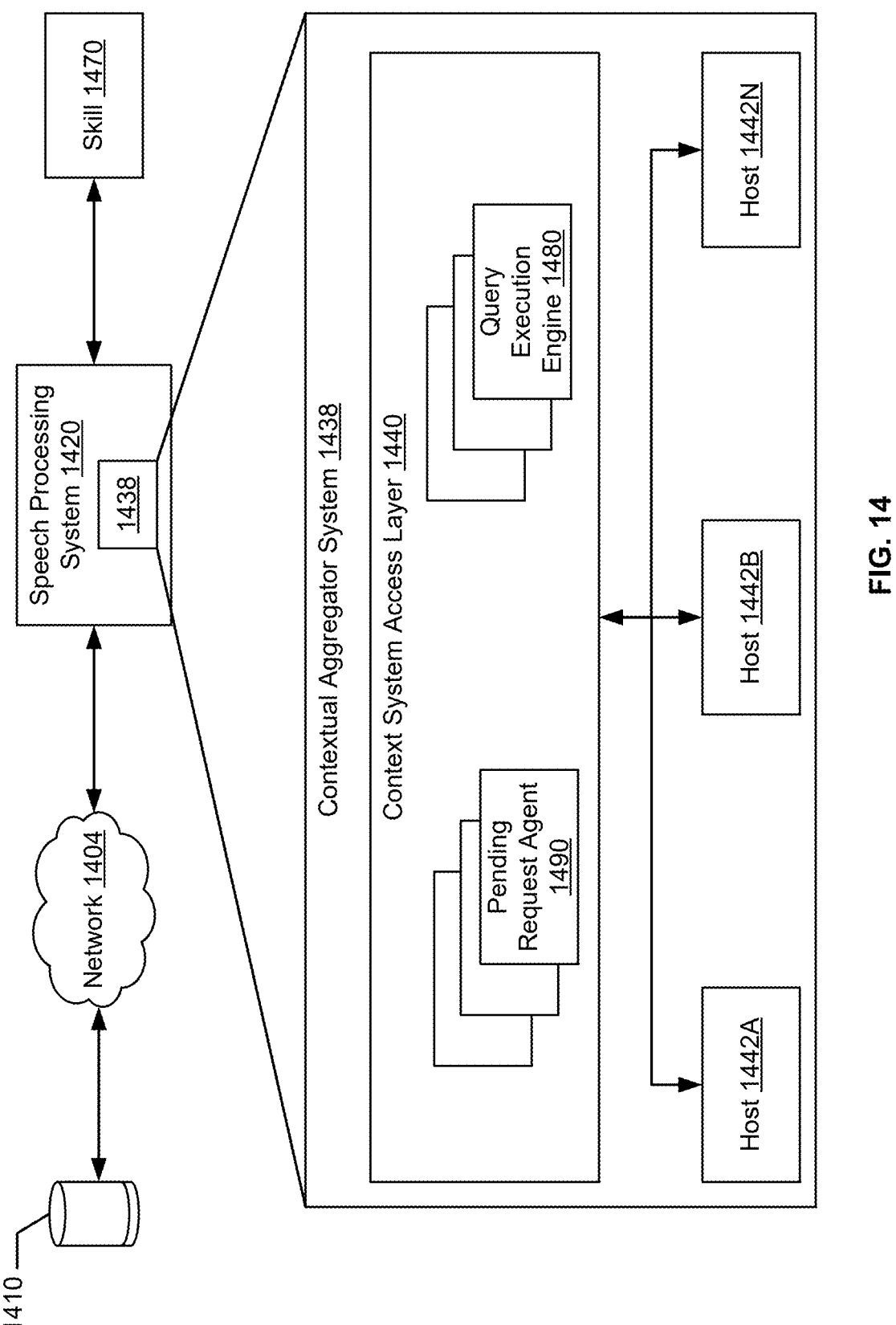
FIG. 14 illustrates a system including an architecture for shared execution caching of contextual data for speech processing, according to embodiments of the present disclosure.

FIG. 14 illustrates a system 1400 including an architecture for shared execution caching of contextual data for speech processing, according to embodiments of the present disclosure. As shown in FIG. 14, the system 1400 includes a computing device 1410, a speech processing system 1420, a skill 1470, and a context aggregator system 1438. In various examples, computing device 1410 may be configured in communication with the speech processing system 1420 over a network 1404. Speech processing system 1420 may include one or more speech processing devices and/or components. As described in further detail below, network 1404 may be, for example, a wide area network, such as the Internet. Speech processing system 1420 (which may include one or more different physical devices) may be capable of performing speech processing (e.g., ASR and NLU) as well as non-speech processing operations as described herein. A single computing device may perform all speech processing or multiple computing devices may combine to perform all speech processing. In various examples, context aggregator system 1438 may be a component of speech processing system 1420, as shown in FIG. 14. However, in other examples, context aggregator system 1438 may be a separate system comprising one or more computing devices configured in communication with one or more components of speech processing system 1420.

Context aggregator system 1438 may be a system through which speech processing system 1420, generally, and/or skill 1470 may store, retrieve, and/or modify contextual data. Context aggregator system 1438 may have a context system access layer 1440 which may provide access to underlying hosts of context systems (e.g., hosts 1442A, 1442B, . . . , 1442N). Each host 1442A, 1442B, . . . , 1442N may represent one or more context systems (e.g., computing devices including storage for storing contextual data). Hosts 1442A, 1442B, . . . 1442N may comprise non-transitory, computer-readable storage comprising one or more databases for storing contextual data. Additionally, each of hosts 1442A, 1442B, . . . , 1442N may comprise one or more processing elements. Pending request agents 1490 may be a list of pending requests partitioned based on a partition key. For example, a particular pending request agent 1490 may store a list of all currently-pending requests with a particular request ID "1234". In another example, a particular pending request agent 1490 may store all currently-pending requests for a device ID "X73126-J". Although depicted as part of context system access layer 1440, pending request agents 1490 may be local to hosts 1442A, 1442B, . . . , 1442N. In at least some examples, one or more pending request agents 1490 may be associated with a particular host among hosts 1442A, 1442B, . . . , 1442N.

Query execution engines 1480 may be effective to generate executable processes (e.g., executable instructions effective to carry out requests) based on the lists of pending requests stored by pending request agent(s) 1490. For example, query execution engine 1480 may generate an executable process (e.g., a GraphQL query) used to return the value of a field of a database stored by host 1442A or by a database to which host 1442A has access. Context system access layer 1440 and/or query execution engines 1480 may be effective to direct executable processes associated with the same entity to the same host. For example, a list of requests of a particular pending request agent 1490 may be associated with a particular device ID. A particular host (e.g., host 1442B) may be associated with (or assigned to) the particular device ID. A query execution engine 1480 may generate one or more processes associated with the requests and may send all the executable processes associated with the relevant entity to the same host (e.g., to host 1442B). Although depicted as part of context system access layer 1440, query execution engines 1480 may instead be local to hosts 1442A, 1442B, . . . , 1442N. In at least some examples, one or more query execution engines 1480 may be associated with a particular host among hosts 1442A, 1442B, . . . , 1442N.

Query execution engine 1480 may determine redundancy in the list of requests in a pending request agent 1490. For example, if a first request and a second request for a particular entity (e.g., a particular account ID) may be identical, with each request being a request for a value of a database field "A". Query execution engine 1480 may determine the redundancy between the first request and the second request by referencing the first request and the second request in the relevant pending request agent 1490.

Thereafter, query execution engine 1480 may generate a first executable process (e.g., a query) corresponding to one of the requests (e.g., the first request). Query execution engine 1480 may send the executable process to a host associated with the particular account ID. Query execution engine 1480 may send an instruction to cache the result of the executable process. Additionally, in some examples, query execution engine 1480 may store the result in a cache accessible by query execution engine 1480. Thereafter, query execution engine 1480 may provide the previously cached result of the first executable process in response to the redundant request (e.g., the second request).

In various examples, requests of pending request agents 1490 may be associated with timestamps. Accordingly, in some examples, query execution engine 1480 may use the earliest redundant request to perform the executable operation, while later requests may use the cached result of the earlier request. Such an architecture may reduce the compute load on the hosts 1442A, 1442B, . . . , 1442N by exploiting redundancy among requests and reducing lookup operations using shared execution caching. Additionally, the architecture described herein may reduce latency from the perspective of the requesting speech-processing component. In various further examples, query execution engine 1480 may generate an executable instruction for the request that includes the largest amount (or greater than threshold amount) of redundant requests and may cache the returned results. For example, a first request received at time t=0 may request fields A and B. A second request received at time t=1 may request fields A, B, and E. A third request received at time t=2 may request fields A, B, C, D, and E. Although, the third request may have been received at a later point in time relative to the first and second request, in some examples, the query execution engine 1480 may generate an executable instruction corresponding to the third request first and may cache the retrieved fields. Thereafter, cached results for fields A and B may be provided in response to the first request and cached results for fields A, B, and E, may be provided in response to the second request.

Query execution engine 1480, whether executed on a host 1442A, 1442B, . . . , 1442N or as part of context system access layer 1440, may be effective to perform a process. Prior to the start of the process, one or more contextual data requests may be generated. For example, a first contextual data request related to the request ID 2356 may be generated by an NLU component to determine an intent hypothesis. The first contextual data request may be a request for account information related to the request ID. Similarly, a second contextual data request related to the request ID 2356 may be generated by a skill to which the intent has been passed. The second contextual data request may also be a request for at least some of the same account information related to the request ID as in the first contextual data request. Context system access layer 1440 and/or a query execution engine 1480 may route both the first and second contextual data requests to a host associated with the entity identifier data. In the example, the entity identifier data may be the request ID 2356. In the example, host 1442A may be associated with request ID 2356. Accordingly, the first and second contextual data requests may be sent to host 1442A and may be stored by a pending request agent 1490 associated with host 1442A.

The process includes the query execution engine 1480 associated with host 1442A analyzing the pending request agent 1490 associated with host 1442A for redundancy. The query execution engine 1480 may determine that both the first and second contextual data requests include a request for a field of a database storing an account number. Accordingly, the query execution engine 1480 may generate an executable instruction for a processor of host 1442A to retrieve the account number from the field of the database and may store the account number in a cache. The cache may be local to host 1442A or local to context system access layer 1440.

Thereafter, query execution engine 1480 may provide the account number stored in the cache in response to the first context data request generated by the NLU and the second context data request generated by the skill (and in response to any additional requests for the account number in pending request agent 1490). Accordingly, by routing speech processing contextual data requests related to the same entity to the same host, redundancy among requests can be exploited and the number of new executable processes generated by the host may be limited.

Additionally, as previously described, query execution engines 1480 may comprise prefetching logic programmed to determine particular database fields to prefetch based on current and/or past processes (e.g., queries). Probability thresholds may be used to determine whether or not to prefetch a particular field. For example, a query execution engine may determine that a query directed to return the value of field A is followed by a query to return the value of field B 91% of the time. In the example, the query execution engine may prefetch any field that has a probability of greater than or equal to 85% of being queries given that a previous field has been queried. Accordingly, in the example, the query execution engine may prefetch field B prior to receiving a query request to fetch field B.

In FIG. 14, device 1410 may receive audio including a spoken utterance of a user via a microphone (or array of microphones) of the device 1410. The device 1410 may generate input audio data corresponding to the audio, and may send the input audio data to the speech processing system 1420 for processing. Alternatively, device 1410 (or another device) may receive text input by the user via either a physical keyboard or virtual keyboard presented on a touch sensitive display of the device 1410. The device 1410 may generate input text data corresponding to the text, and may send the input text data to the speech processing system 1420 for processing. In other embodiments, the device 1410 may detect spoken commands and perform speech recognition processing locally at the device 1410 in order to translate those spoken commands into text data, which the device 1410 then sends to the speech processing system 1420.

The speech processing system 1420 receives input data from a device 1410. If the input data is the input audio data from the device 1410, the speech processing system 1420 performs speech recognition processing (e.g., ASR) on the input audio data to generate input text data. The speech processing system 1420 performs natural language processing on input text data (either received from the device 1410 or generated from the input audio data received from the device 1410) to determine a user command. In various examples, the natural language processing may use contextual data provided by context aggregator system 1438. In some further examples, the natural language processing may produce contextual data that may then be stored in context aggregator system 1438. Some examples of contextual data may include content identifiers, preceding utterance (e.g., an utterance from a previous turn of dialog), previous speech processing system response, on-screen entities, connected devices, user preferences, device identifiers, etc. A user command may correspond to a user request for the system to output content to the user. The requested content to be output may correspond to music, video, search results, weather information, etc. Accordingly, to publish contextual information to context aggregator system 1438 and/or retrieve information from context aggregator system 1438, speech processing components (e.g., NLU, skills, etc.) may send requests to context system access layer 1440. As described above, requests may be partitioned based on a particular partition key that defines a particular entity. Requests for the relevant entity may be stored by a pending request agent 1490. A query execution engine 1480 may thereafter process the requests by generating executable processes that may be executed by a particular host, as described above.

The speech processing system 1420 determines output content responsive to the user command. The output content may be received from a first party (14P) skill (e.g., an skill controlled or managed by the natural language speech processing system 1420 or by the company or entity controlling the speech processing system 1420) or a third party (3P) skill (e.g., an skill managed by another computing device(s) in communication with the speech processing system 1420 but not controlled or managed by the speech processing system 1420 or by the entity controlling the speech processing system 1420). In various examples, the speech processing system 1420 and/or the skill generating the output content may consume contextual data to determine the output content. Similarly, in various examples, the speech processing system 1420 and/or the skill may generate new contextual data during the interaction with the user and may store such contextual data in context aggregator system 1438 using context access layer 1440.

The speech processing system 1420 sends back to the initiating device (1410) output data including the output content responsive to the user command. The device (1410) may emit the output data as audio, present the output data on a display, or perform some other operation responsive to the user command. The speech processing system 1420 may determine output content responsive to the user command by performing an action. For example, in response to the user command, the speech processing system 1420 may determine one or more actions that correspond to the user command and may select one of the actions to perform. Examples of actions include launching an skill (e.g., sending dialog data or other data to a specific skill to be processed, which may correspond to a dispatch request), performing disambiguation (e.g., determining that the speech processing system 1420 does not have enough information to execute a command and generating a dialog request that requests additional information from the user), confirming the action with a user (e.g., generating audio data and/or display data indicating the action to be performed and requesting confirmation from the user), displaying information to the user (e.g., generating display data in response to the user command, such as displaying a second page of content), playing audio information for the user (e.g., generating audio data in response to the user command, such as indicating that the skill is being launched, that a volume has been changed, and/or the like), or the like.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:

one or more processors; and one or more memories storing instructions that, upon execution by the one or more processors, configure the system to:

send, to a device, an object that causes a first presentation of first content and a second presentation of second content in association with the first presentation, the object indicating that the second content is to be requested;

receive, from the device based at least in part on the object and while the first presentation and the second presentation are caused, first data indicating a first request for the second content;

generate, based at least in part on the first data, contextual data indicating the first presentation by the device and including a content identifier of the first content;

generate an association between the contextual data and at least one of a device identifier of the device or an account identifier of an account associated with the device;

receive, from the device, second data corresponding to a natural language user input;

determine, by at least using a language model, that the second data indicates a second request for a content action, the content action determined based at least in part on the second data, the association, and the contextual data; and cause the content action to be performed.

2. The system of claim 1, wherein the language model is configured to determine, upon the second data lacking an indication of target content on which the content action is to be performed, the content action and the target content based at least in part on the second data and the contextual data, wherein the content action is performed on the target content.

3. The system of claim 1, wherein the language model is configured to determine the content action based at least in part on the second data and target content on which the content action is to be performed based at least in part on the contextual data.

4. The system of claim 1, wherein the language model is configured to determine, based at least in part on the second data and the contextual data, a type of the content action and target content on which the content action is to be performed.

5. The system of claim 1, wherein the object is configured to cause the device to present the second content upon the first presentation of the first content and to request the second content upon the second presentation of the second content.

6. The system of claim 1, wherein the object indicates a parameter to present the second content in association with the first presentation of the first content and a frequency at which the second content is to be requested up on the second presentation of the second content.

7. The system of claim 1, wherein the object is configured to cause the device to increment a time counter upon the second presentation of the second content and to send the first data based at least in part on a value of the time counter.

8. The system of claim 1, wherein the second data includes a network address of the second content, and wherein the instructions, upon execution by the one or more processors, further configure the system to:

determine an association between the first request and the first content based at least in part on the network address, wherein the contextual data is generated further based at least in part on the association.

9. The system of claim 1, wherein the second data includes a network address of the second content and a value of a time counter associated with requesting the second content, wherein the value is appended to the network address.

10. The system of claim 9, wherein the instructions, upon execution by the one or more processors, further configure the system to:

determine, from the network address, the value; and generate third data that includes a timestamp representing the value and a content identifier of the first content.

11. The system of claim 1, wherein the instructions, upon execution by the one or more processors, further configure the system to:

store, based at least in part on the first data, third data indicating the first presentation of the first content by the device;

determine that the second content has not been requested for a period of time subsequent to receiving the second data; and indicate that the third data is invalid.

12. The system of claim 11, wherein the content action is a first content action, wherein the instructions, upon execution by the one or more processors, further configure the system to:

receive, while the third data is valid, fourth data indicating a third request for a second content action;

determine, based at least in part on the third data being valid, that the second content action is associated with the first presentation of the first content; and cause the content action to be performed.

13. A method comprising:

sending, to a device, an object that causes a first presentation of first content and a second presentation of second content in association with the first presentation, the object indicating that the second content is to be requested;

receiving, from the device based at least in part on the object and while the first presentation and the second presentation are caused, first data indicating a first request for the second content;

generating, based at least in part on the first data, contextual data indicating the first presentation by the device and including a content identifier of the first content;

generating an association between the contextual data and at least one of a device identifier of the device or an account identifier of an account associated with the device;

receiving, from the device, second data corresponding to a natural language user input;

determining, by at least using a language model, that the second data indicates a second request for a content action, the content action determined based at least in part on the second data, the association, and the contextual data; and causing the content action to be performed.

14. The method of claim 13, further comprising:

determining an association between the first request and the first content based at least in part on source information of a content source, wherein the contextual data is generated based at least in part on the source information, and wherein the object includes the source information.

15. The method of claim 13, further comprising:

receiving, from the device based at least in part on the object and while the first presentation and the second presentation are caused, third data indicating a third request for the second content, wherein a time difference associated with the first data being received and the third data being received is indicated by the object.

16. The method of claim 13, further comprising:

receiving third data from another device, wherein the device and the other device are associated with an account, the third data indicating a third request for another content action;

determining that the third request is associated with the account;

determining, based at least in part on the contextual data, that the other content action is associated with the first presentation of the first content; and causing the other content action to be performed by the other device.

17. One or more non-transitory computer-readable storage media storing instructions that, upon execution on a system, cause the system to perform operations comprising:

sending, to a device, an object that causes a first presentation of first content and a second presentation of second content in association with the first presentation, the object indicating that the second content is to be requested;

receiving, from the device based at least in part on the object and while the first presentation and the second presentation are caused, first data indicating a first request for the second content;

generating, based at least in part on the first data, contextual data indicating the first presentation by the device and including a content identifier of the first content;

generating an association between the contextual data and at least one of a device identifier of the device or an account identifier of an account associated with the device;

receiving, from the device, second data corresponding to a natural language user input;

determining, by at least using a language model, that the second data indicates a second request for a content action, the content action determined based at least in part on the second data, the association, and the contextual data; and causing the content action to be performed.

18. The one or more non-transitory computer-readable storage media of claim 17, wherein the operations further comprise:

associating a presentation identifier with a content identifier of the first content; and including the presentation identifier in the object, wherein the first data indicates the presentation identifier, and wherein the contextual data is generated based at least in part on the presentation identifier.

19. The one or more non-transitory computer-readable storage media of claim 18, wherein the operations further comprise:

determining the presentation identifier from the first data;

determining the content identifier based at least in part on an association between the presentation identifier and the content identifier; and storing the content identifier in the contextual data.

20. The one or more non-transitory computer-readable storage media of claim 17, wherein the operations further comprise:

associating a presentation identifier with the content identifier of the first content and at least one of the device identifier of the device or the account identifier of an account associated with the device;

determining the presentation identifier from the first data; and determining the content identifier based at least in part on an association between the presentation identifier and the content identifier.

* * * * *